US006569343B1

(12) United States Patent
Suzuki et al.

(10) Patent No.: US 6,569,343 B1
(45) Date of Patent: May 27, 2003

(54) METHOD FOR PRODUCING LIQUID DISCHARGE HEAD, LIQUID DISCHARGE HEAD, HEAD CARTRIDGE, LIQUID DISCHARGING RECORDING APPARATUS, METHOD FOR PRODUCING SILICON PLATE AND SILICON PLATE

(75) Inventors: Yoshiaki Suzuki, Yokohama (JP); Toshio Kashino, Fujisawa (JP); Masashi Miyagawa, Yokohama (JP); Hiroaki Mihara, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 09/609,223

(22) Filed: Jun. 30, 2000

(30) Foreign Application Priority Data

Jul. 2, 1999 (JP) .......................................... 11-189629

(51) Int. Cl.[7] ............................................... G11B 5/127

(52) U.S. Cl. ............................... 216/27; 216/2; 216/52; 216/79; 438/460; 438/462; 438/464; 438/690; 438/691; 438/692

(58) Field of Search ............................... 216/2, 27, 52, 216/79; 438/460, 462, 464, 690, 691, 692, 719, 977

(56) References Cited

U.S. PATENT DOCUMENTS

| | | | | |
|---|---|---|---|---|
| 3,924,323 A | * 12/1975 | Trevail et al. | ................ | 438/17 |
| 4,882,245 A | 11/1989 | Gelorme et al. | .............. | 430/14 |
| 4,940,651 A | 7/1990 | Brown et al. | ............... | 430/325 |

(List continued on next page.)

FOREIGN PATENT DOCUMENTS

| | | |
|---|---|---|
| EP | 0921004 A | 6/1999 |
| JP | 9-213662 | 8/1997 |
| JP | 10-44438 | 2/1998 |
| WO | WO 98/51506 | 11/1998 |

OTHER PUBLICATIONS

Patent Abstracts of Japan; Kamisuke Shinichi; "Nozzle Plate for Ink Jet Head and Manufacture thereof"; Dec. 8, 1997. JP 09207341.

Patent Abstracts of Japan; Kurihara Yasutoshi; "Manufacturing Method of Semiconductor Distortion Detecting Element for Displacement Transducher"; Aug. 11, 1980. JP 55143077.

Patent Abstracts of Japan; Sakuraoka Satoshi; Manufacture for Semiconductor Chip, and Manufacture for Thermal Ink–Jet Head; Sep. 14, 1999. JP 11245415.

(List continued on next page.)

*Primary Examiner*—Randy Gulakowski
*Assistant Examiner*—Gentle E. Winter
(74) *Attorney, Agent, or Firm*—Fitzpatrick, Cella, Harper & Scinto

(57) ABSTRACT

The invention provides a method for producing a liquid discharge head including a head main body provided with plural energy generation elements for generating energy for discharging liquid as a flying liquid droplet and plural flow paths in which the energy generation elements are respectively provided, and an orifice plate provided with plural discharge ports respectively communicating with the flow paths, wherein the orifice plate and the head main body are mutually adjoined, the method comprising a step of preparing a substrate consisting of a silicon-containing material for preparing the orifice plate a step of forming, by dry etching, plural recesses in positions on the surface of the substrate respectively corresponding to the discharge ports, with a depth larger by 5 to 50 $\mu$m than the depth of the discharge ports, a step of thinning the substrate from the reverse side thereof until the depth of the recesses becomes equal to the depth of the discharge apertures to form plural discharge ports on the substrate, thereby preparing the orifice plate constructed by forming the plural discharge ports in the substrate, and a step of adjoining the orifice plate to the head main body.

7 Claims, 21 Drawing Sheets

U.S. PATENT DOCUMENTS

| | | | | | |
|---|---|---|---|---|---|
| 5,026,624 | A | | 6/1991 | Day et al. | 430/280 |
| 5,071,792 | A | | 12/1991 | VanVonno et al. | 437/209 |
| 5,102,772 | A | | 4/1992 | Angelo et al. | 430/280 |
| 5,229,251 | A | | 7/1993 | Babich et al. | 430/280 |
| 5,278,010 | A | | 1/1994 | Day et al. | 430/18 |
| 5,304,457 | A | | 4/1994 | Day et al. | 430/280 |
| 5,478,606 | A | | 12/1995 | Ohkuma et al. | 427/555 |
| 5,482,899 | A | * | 1/1996 | McKenna et al. | 156/344 |
| 5,498,312 | A | | 3/1996 | Laermer et al. | 156/643.1 |
| 5,836,807 | A | * | 11/1998 | Leach | 451/287 |
| 5,994,205 | A | * | 11/1999 | Yamamoto et al. | 438/110 |
| 6,013,534 | A | * | 1/2000 | Mountain | 438/15 |
| 6,083,811 | A | * | 7/2000 | Riding et al. | 438/416 |
| 6,140,151 | A | * | 10/2000 | Akram | 438/113 |
| 6,184,109 | B1 | * | 2/2001 | Sasaki et al. | 438/113 |

OTHER PUBLICATIONS

Patent Abstracts of Japan, vol. 1999, No. 14, Dec. 22, 1999 (JP 11 245415 A, Sep. 14, 1999).

Patent Abstracts of Japan, vol. 1997, No. 12, Dec. 25, 1997 (JP 09 207341 A, Aug. 12, 1997).

Patent Abstracts of Japan, vol. 005, No. 015 (E–043), Jan. 29, 1981 (JP 55 143077 A, Nov. 8, 1980).

Patent Abstracts of Japan, vol. 007, No. 217 (M–245), Sep. 27, 1983 (JP 58 112755 A, Jul. 5, 1983).

* cited by examiner

FIG. 4A1
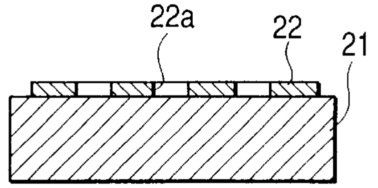
FIG. 4A2
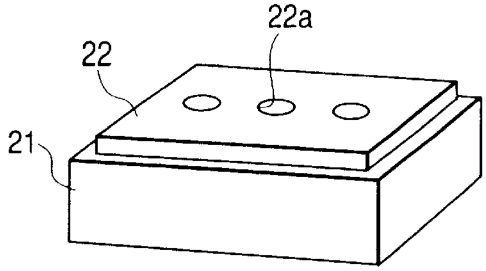
FIG. 4B
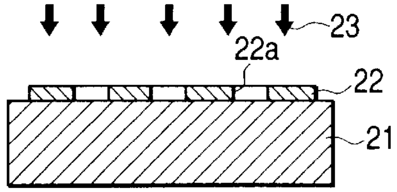
FIG. 4C2
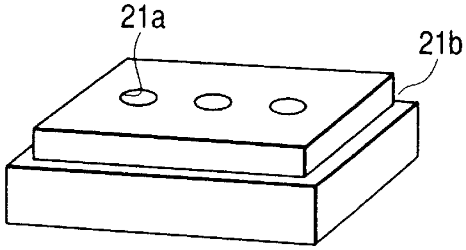
FIG. 4C1
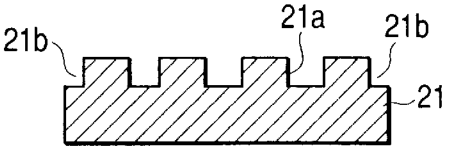
FIG. 4D2
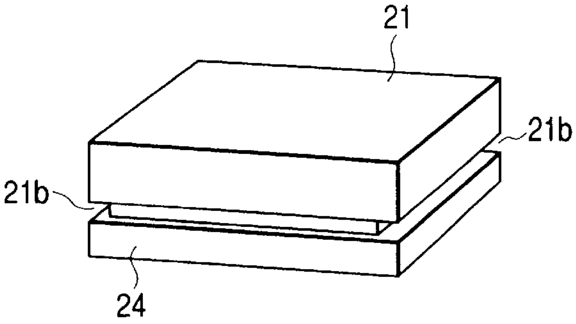
FIG. 4D1
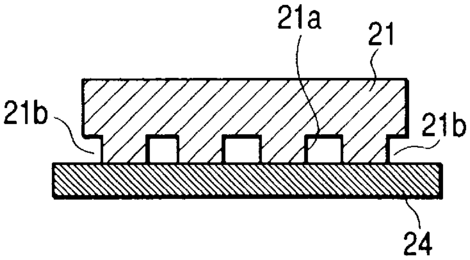
FIG. 4E2
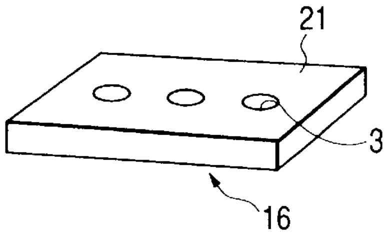
FIG. 4E1
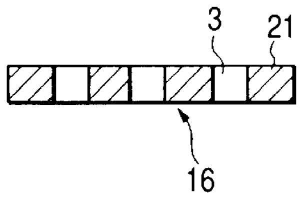

FIG. 8A1
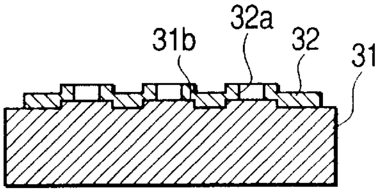
FIG. 8A2
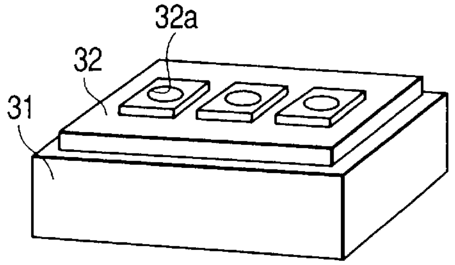
FIG. 8B
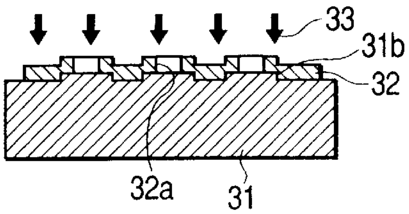
FIG. 8C1
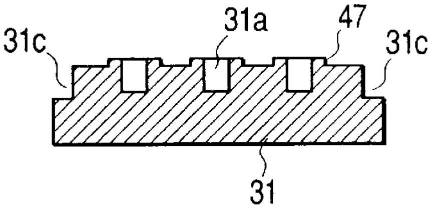
FIG. 8C2
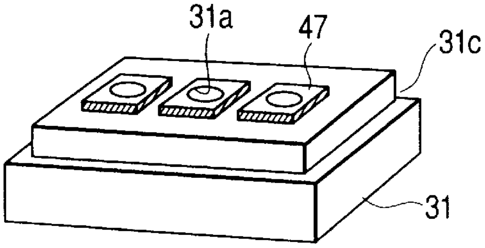
FIG. 8D1
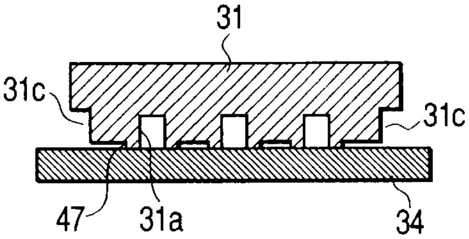
FIG. 8D2
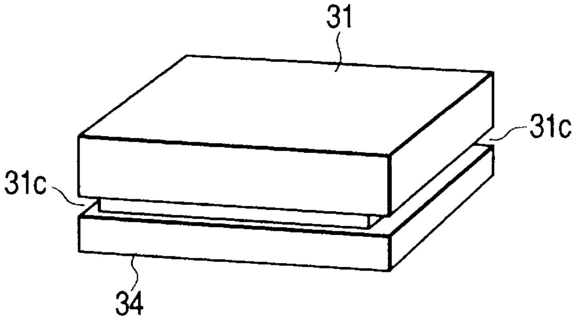
FIG. 8E1
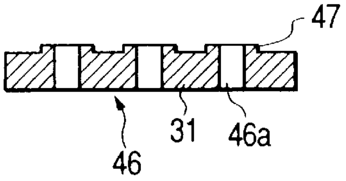
FIG. 8E2
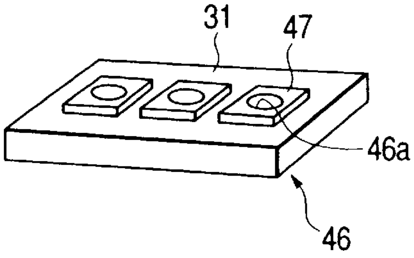

FIG. 12A1
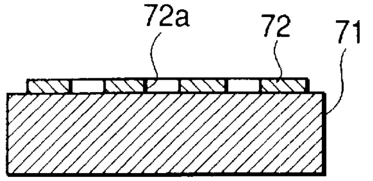
FIG. 12B
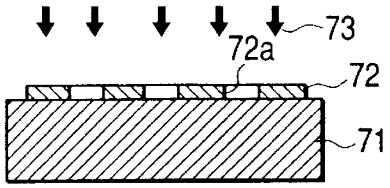
FIG. 12C1
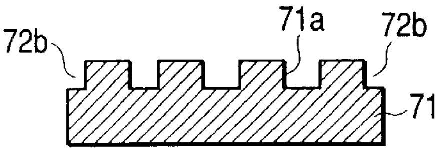
FIG. 12D
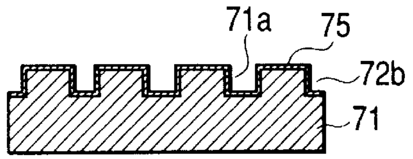
FIG. 12E1
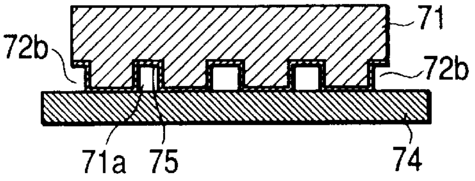
FIG. 12F
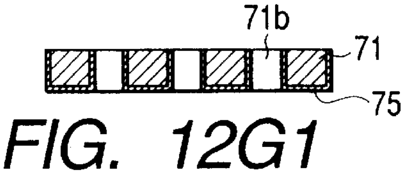
FIG. 12G1
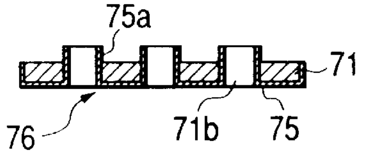
FIG. 12A2
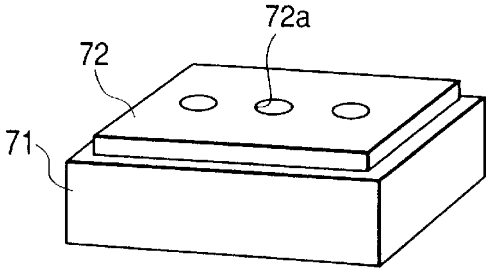
FIG. 12C2
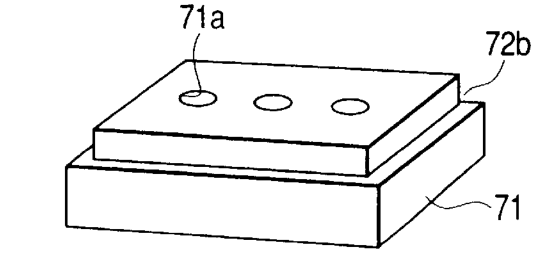
FIG. 12E2
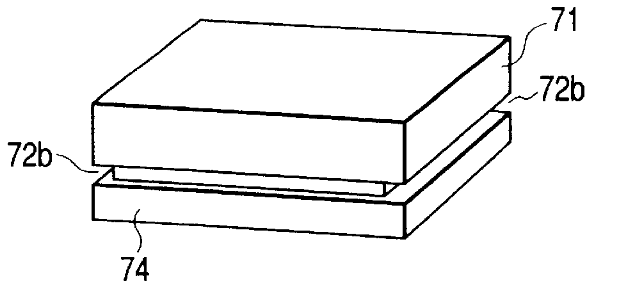
FIG. 12G2
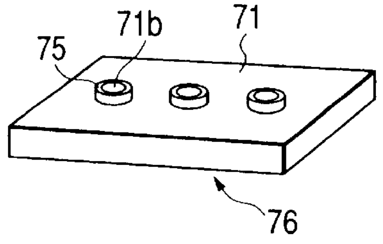

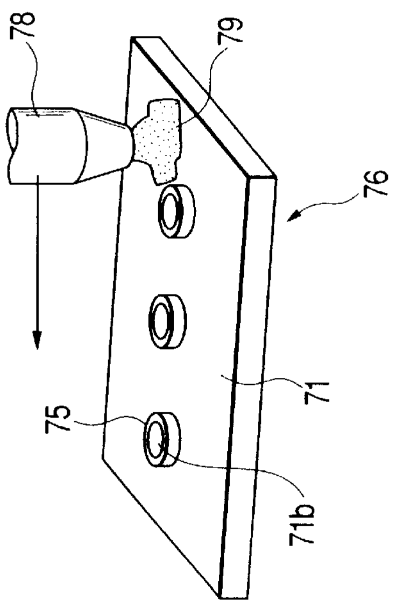
FIG. 14A2
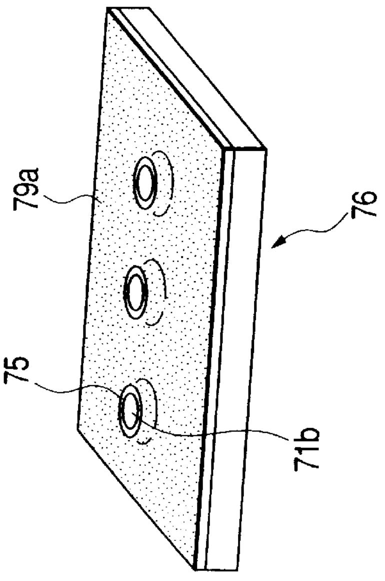
FIG. 14B2
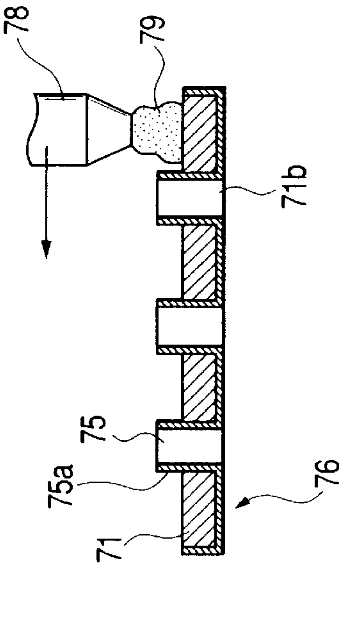
FIG. 14A1
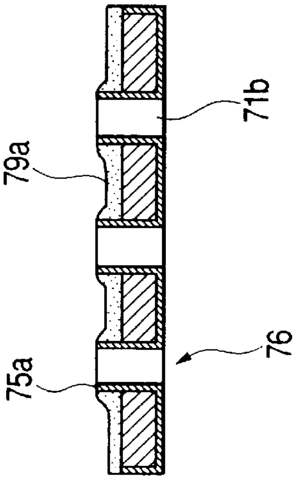
FIG. 14B1

PROJECTION FORMATION
101
RECESS FORMATION
102
PROTECTION FILM FORMATION
103
FILLER APPLICATION
104
APPLY UV PEEL TAPE
105
GRINDING POLISHING
106
ETCHING
107
PEEL UV PEEL TAPE
108
FILLER REMOVAL
109

202
201

201b
201a

206

210

204

206a 216
203

METHOD FOR PRODUCING LIQUID DISCHARGE HEAD, LIQUID DISCHARGE HEAD, HEAD CARTRIDGE, LIQUID DISCHARGING RECORDING APPARATUS, METHOD FOR PRODUCING SILICON PLATE AND SILICON PLATE

BACKGROUND OF THE INVENTION

1. Field of the Invention

The present invention relates to a method for producing a liquid discharge head for discharging liquid as flying liquid droplet and depositing such liquid droplet on a recording medium thereby forming a record, a liquid discharge head produced by such method, a head cartridge and a liquid discharge recording apparatus equipped with such liquid discharge head.

The present invention also relates to a method for producing a liquid discharge head applicable to a printer for recording on recording media such as paper, fiber, yarn, fabrics, leather, metal, plastics, glass, timber, ceramics etc., a copying machine, a facsimile apparatus provided with a communication system, a word processor provided with a printer unit etc., and an industrial recording apparatus combined in complex manner with various processing apparatus, a liquid discharge head produced by such method, a head cartridge and a liquid discharge recording apparatus equipped with such liquid discharge head.

In the present invention, the word "recording" not only means formation of a meaningful image such as a character or graphics but also formation of a meaningless image such as a pattern.

The present invention further relates to a method for producing a silicon plate having a functional unit, and a silicon plate produced by such producing method.

2. Related Background Art

For improving dot placement accuracy of the liquid droplet by an ink jet head which is a liquid discharge head, there has conventionally employed a tapered orifice which is thicker in the base portion at the liquid chamber side and thinner in the front end portion at the discharge port side, with a cross section gradually decreasing toward the front end portion. For forming such tapered orifice on an orifice plate, there has been employed, for example, electroforming on a nickel sheet, hole formation on a resin sheet with an excimer laser and hole formation on a stainless steel sheet by pressing.

Also the European Patent Laid-Open No. 921004 discloses the use of silicon (Si) for the orifice plate of the ink jet head. The specification of this patent describes formation of an orifice plate consisting of silicon and having discharge orifices, by grinding a silicon plate in which penetrating holes are formed into a thickness of 10 to 150 $\mu$m. For forming such discharge orifices, there are described a method of ion beam working (in vacuum), excimer laser working and etching (dry etching or wet etching).

Also for silicon material, the U.S. Pat. No. 5,498,312 discloses a technology of executing plasma etching introducing a mixture of etching gas such as $SF_6$, $CF_4$ or $NF_3$ and passivating gas such as $CHF_3$, $C_2F_4$, $C_2F_6$, $C_2H_2F_2$ or $C_4H_8$ into a chamber and employing a plasma density of $10^{12}$ ion/cm$^3$ or higher and an energy range of 1 to 4 eV in order to increase the etching rate and avoiding the drawback of masking.

However, the above-described method for producing the orifice plate for the ink jet head utilizing silicon, disclosed in the aforementioned European Patent Laid-Open No. 921004 involves a step of preparing a silicon plate thicker than the predetermined thickness of the orifice plate and penetrating such silicon plate, and is therefore relatively time-consuming, so that there is still a room for the improvement in the mass producivility.

Also in case of etching of the silicon plate with the method described in the aforementioned U.S. Pat. No. 5,498,312, the depth of the etched hole is little controllable and the fluctuation in the etched depth, resulting from the fluctuation in the material constituting the silicon plate, cannot be controlled, so that it is difficult to form the holes with satisfactory precision.

SUMMARY OF THE INVENTION

In consideration of the foregoing, a principal object of the present invention is to provide a novel method excellent in mass producibility capable of forming penetrating holes of a uniform shape in plural units at the same time, without being affected by the fluctuation in the crystal structure of silicon.

In another aspect of the present invention, in case a silicon plate in which penetrating holes are formed is to be used as the orifice plate or as a filter for preventing dust intrusion in the ink jet head, the interior of such penetrating hole comes into contact with the liquid. Since it is difficult to form a film in the interior of the penetrating hole, there cannot be used certain liquid such as strongly alkaline liquid.

Therefore, another object of the present invention is to provide a silicon plate in which the interior of the penetrating hole is not etched even in contact with the liquid which tends to etch silicon.

Still another object of the present invention is to provide a method, in case of producing a liquid discharge head with an orifice plate consisting of silicon which is same as that constituting an element substrate bearing a thermal energy generating element, capable of producing a liquid discharge head of a long dimension with satisfactory reliability, a liquid discharge head produced by such method, a liquid discharge head cartridge and a liquid discharge recording apparatus utilizing such liquid discharge head. Still another object of the present invention is to provide a method for producing a liquid discharge head, capable of realizing an assembling method enabling alignment not only of a single nozzle array but also of plural nozzle arrays.

The principal features of the present invention, for attaining the above-mentioned objects, are as follows.

The present invention provides a method for producing a liquid discharge head provided with plural energy generation elements for generating energy for discharging liquid as a flying liquid droplet, a head main body having plural liquid flow paths in which the energy generation elements are respectively provided, and an orifice plate having plural discharge ports respectively communicating with the liquid flow paths wherein the orifice plate and the head main body are mutually adjoined, the method comprising a step of preparing a substrate of a silicon-containing material for producing the orifice plate, a step of forming, in positions on the surface of the substrate corresponding to the discharge ports, plural recesses of the depth larger by 5 to 50 $\mu$m than the depth of the discharge ports by dry etching, a step of thinning the substrate from the rear surface side opposite to the above-mentioned surface until the depth of the recesses becomes equal to that of the discharge ports to form plural discharge ports on the substrate thereby obtaining the orifice plate on which the plural discharge ports are formed, and a step of adjoining the orifice plate to the head main body.

The present invention is also featured by a method for producing the liquid discharge head according to the foregoing, wherein the dry etching is executed by repeating etching with any one of $SF_6$, $CF_4$ and $NF_3$ gas and forming fluorine-containing polymer on the lateral wall with any one of $CHF_3$, $C_2F_4$, $C_2F_6$, $C_2H_2F_2$ and $C_4H_8$ gas.

Furthermore, it is preferred that, in the aforementioned step of forming the plural recesses by dry etching, the discharge port is so shaped as to have the cross sectional area gradually decreasing from the side of the aforementioned liquid flow path to the front end side of the discharge port and as to have a region in which the cross sectional area is constant, and that the respective recess is so shaped by dry etching as that the discharge port is opened in such region.

Furthermore, it is preferred that the aforementioned step of thinning the substrate is executed by at least either of grinding, polishing and etching.

Furthermore, the mentioned preferably comprises further, after the formation of the plural recesses on the substrate, a step of forming a protective film in a portion of the substrate coming into contact with the ink.

Furthermore, the method preferably comprises further, after the step of adjoining the orifice plate to the head main body, a step of coating ink-resistant resin on a surface having discharge ports.

Furthermore, the method preferably comprises further a step of filing resin or metal in the recesses, after the aforementioned step of forming the recesses or after the step of forming the protective film and before the step of thinning the substrate, and a step of removing the filled resin or metal after the thinning of the substrate.

Furthermore, the method preferably comprises further a step of applying a UV peelable tape on the surface of the substrate in order to maintain the strength of the substrate at the grinding or polishing thereof, after the aforementioned step of forming the recesses or after the step of forming the protective film or after the step of filling resin or metal in the recesses and before the step of thinning the substrate, and a step of removing the UV peelable tape after the step of thinning of the substrate.

Furthermore, the method preferably comprises further a step of applying a UV peelable tape on the surface of the substrate in order to maintain to a certain extent the strength of the substrate at the grinding or polishing thereof, after the aforementioned step of forming the protective film and before the step of thinning the substrate, and a step of forming a projection by dry etching around the discharge port at the adjoining side of the orifice plate, before the formation of the recesses, in order to form a projection to enter into and engage with the liquid flow path.

Furthermore, it is preferred that the aforementioned step of forming the protective film on the substrate forms the protective film on the entire internal wall of the recesses and the method preferably comprises further, after the aforementioned step of thinning the substrate in order to form the plural recesses in the substrate, a step of removing the surfacial layer of the substrate by wet etching to cause a part of the protective film, constituting the internal wall of the discharge port, to protrude from the surface of the substrate thereby forming the projection.

Furthermore, the method preferably comprises further, after the aforementioned step of causing a part of the protective film, formed on the internal wall of the discharge port, to protrude from the surface of the substrate, a step of forming a water-repellent film around the projection.

Furthermore, the method preferably comprises further, after the step of thinning the substrate, a step of adjoining a frame member consisting of silicon or glass for reinforcing the substrate, to the substrate by vacuum thermal adjoining, anodic adjoining or adhesive material.

Furthermore, it is preferred that the aforementioned frame member is to be adjoined around a portion of a surface, opposed to and adjoined to the head main body, of the substrate, and it is preferred that the aforementioned step of adjoining the orifice plate, bearing the adjoined frame member, to the head main body further includes a step of filling head-conductive resin in a gap between the head main body and the frame member so as to increase the adhesion strength of the head main body and the orifice plate while maintaining the thermal conductivity between the head main body adjoined to the orifice plate and the frame member.

Furthermore, it is preferred that the substrate, prepared in the aforementioned step of preparing the substrate consisting of the silicon-containing material, is a silicon wafer, that plural orifice plates are prepared from a silicon wafer, and that, in the aforementioned step of forming the plural recesses on the surface of the silicon wafer, groove-shaped plate dividing patterns are formed by dry etching together with the plural recesses on the surface of the silicon wafer, whereby the aforementioned step of thinning the silicon wafer from the reverse side devices the silicon wafer into plural orifice plates by the above-mentioned plate dividing patterns simultaneously with the formation of the discharge ports.

Furthermore, it is preferred that the aforementioned plate dividing patterns are formed excluding the external peripheral portion of the silicon wafer.

Furthermore, the present invention provides a liquid discharge head for discharging liquid utilizing bubble generation induced by applying thermal energy to the liquid, the head being produced by any of the foregoing producing methods.

Furthermore, the present invention provide a head cartridge comprising the aforementioned liquid discharge head and a liquid container, containing liquid to be supplied to the liquid discharge head.

Furthermore, the present invention provides a liquid discharge recording apparatus comprising any of the aforementioned liquid discharge heads, and drive signal supply means for supplying a drive signal for causing the liquid discharge head to discharge liquid.

Furthermore, the present invention provides a liquid discharge recording apparatus comprising any of the aforementioned liquid discharge heads, and recording medium conveying means for conveying a recording medium for receiving the liquid discharged from the liquid discharge head.

Such liquid discharge recording apparatus is to execute recording by discharging liquid from the liquid discharge head and depositing such liquid onto the recording medium.

BRIEF DESCRIPTION OF THE DRAWINGS

FIGS. 4A1, 4A2, 4B, 4C1, 4C2, 4D1, 4D2, 4E1 and 4E2 are views showing a method for producing an orifice plate shown in FIGS. 1 and 2;

FIGS. 8A1, 8A2, 8B, 8C1, 8C2, 8D1, 8D2, 8E1 and 8E2 are views showing a method for producing an orifice plate shown in FIGS. 5 and 6;

FIGS. 12A1, 12A2, 12B, 12C1, 12C2, 12D, 12E1, 12E2, 12F, 12G1 and 12G2 are views showing steps for preparing an orifice plate of the liquid discharge head, in the method for producing the liquid discharge head in the fourth embodiment of the present invention;

FIGS. 14A1, 14A2, 14B1 and 14B2 are views showing a variation of the method for producing the orifice plate shown in FIGS. 12A1, 12A2, 12B, 12C1, 12C2, 12D, 12E1, 12E2, 12F, 12G1 and 12G2;

DETAILED DESCRIPTION OF THE PREFERRED EMBODIMENTS

In the following, the present invention will be clarified in detail by embodiment thereof, with reference to the accompanying drawings.

[First Embodiment]

Figure 1:
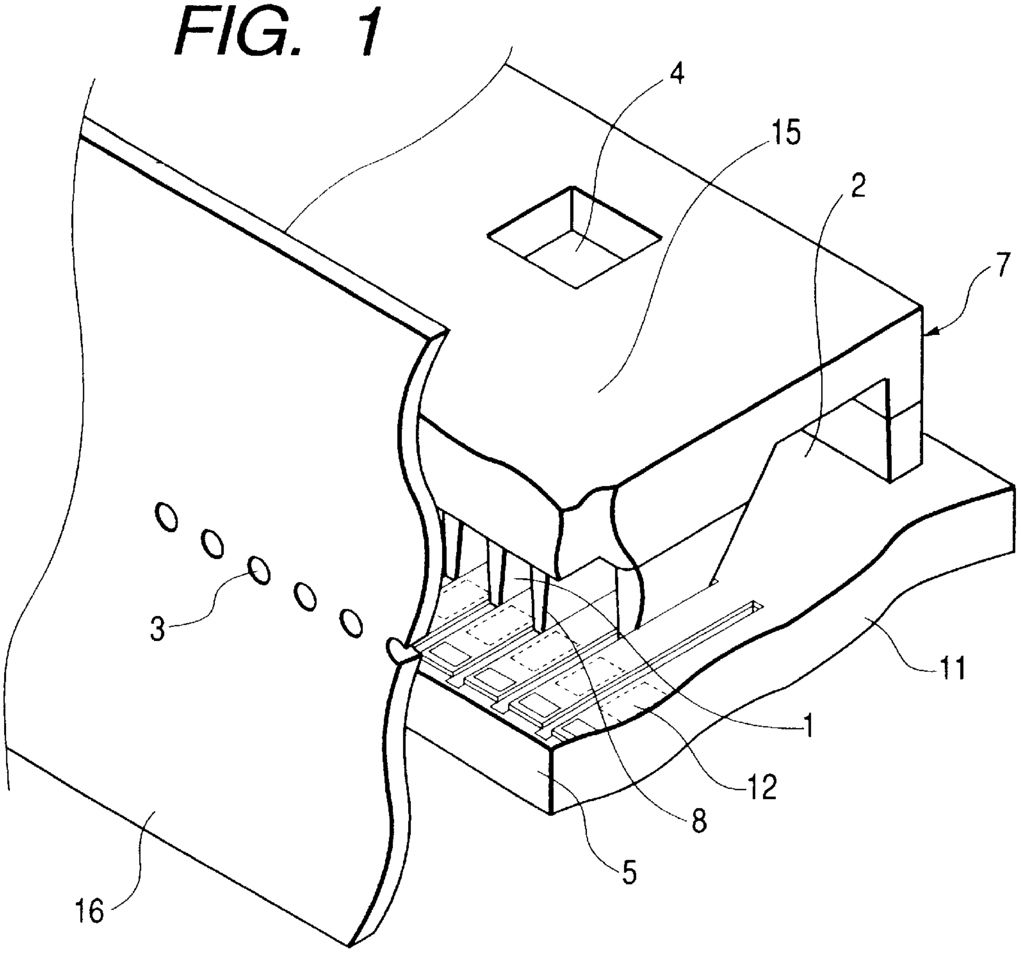
FIG. 1 is a perspective view showing a liquid discharge head in which applied is a method for producing the liquid discharge head, constituting a first embodiment of the present invention.
Figure 2:
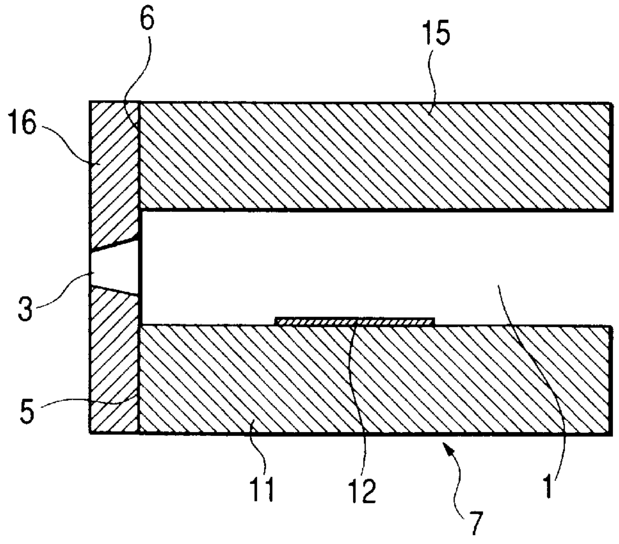
FIG. 2 is a cross-sectional view of the liquid discharge head shown in FIG. 1, along the liquid flow path thereof.

FIG. 1 is a perspective view showing a liquid discharge head, in which applied is a method for producing the liquid discharge head in a first embodiment of the present invention, and FIG. 2 is a cross-sectional view of the liquid discharge head shown in FIG. 1, along the liquid flow path. The producing method for the liquid discharge head of the present invention is attained, in employing silicon as the material of the orifice plate constituting the liquid discharge head, by the development of elementary technologies including etching, thinning and assembling technologies of silicon.

The liquid discharge head, produced by the producing method for the liquid discharge head of the present embodiment, is composed, as shown in FIG. 1, of a head main body 7 by adjoining a top plate 15 to the surface of an element substrate 11, an orifice plate 16 adjoined to the front end face of the head main body 7 etc. The element substrate (hereinafter also called heater board) 11 is provided with plural energy generation elements (hereinafter also called heaters) 12 for generating thermal energy to be utilized for discharging liquid such as ink, and A1 wirings for supplying the energy generation elements 12 with electric signals. The element substrate 11 is prepared by forming, on a Si substrate, the plural energy generation elements 12 and the A1 wirings mentioned above.

On the surface of the element substrate 11, there are formed grooves for forming plural liquid flow paths 1 in which the energy generation elements 12 are respectively provided, and a groove for forming a liquid chamber 2 for temporarily containing ink to be supplied to the respective liquid flow paths 1. The two adjacent liquid flow paths 1 are partitioned by a liquid flow path wall 8 positioned therebetween. The grooves for forming the liquid chamber 2 and the plural liquid flow paths 2 are formed, as will be explained later in relation to FIG. 3, by adhering a wall member including the liquid flow path walls 8 on a surface of the element substrate 11.

On the top plate 15, there is formed a supply opening 4 for supplying the liquid chamber 2 with ink. The head main body 7 including the plural liquid flow paths 1 and the plural energy generation elements 12 is constituted by adjoining the element substrate 11 and the top plate 15 across the wall members, in such a manner that the energy generation elements 12 are respectively provided in the liquid flow paths 1. On the front end face of the head main body 7, namely on a face including an adjoining face of the element substrate 11 with the orifice plate 16 and a face including an adjoining face of the top plate 15 with the orifice plate 16, there are positioned the ports of the respective liquid flow paths. The orifice plate 16, adjoined to the adjoining face 5 of the element substrate 11 and that 6 of the top plate 15, is provided with plural discharge ports (hereinafter also called orifices) 3 respectively communicating with the liquid flow paths 1.

In such liquid discharge head, thermal energy generated by the energy generation element 12 acts on the ink in the liquid flow path 1 to generate a bubble on the energy generation element 12, and the ink is discharged from the discharge port 3 utilizing such bubble generation.

Figure 3:
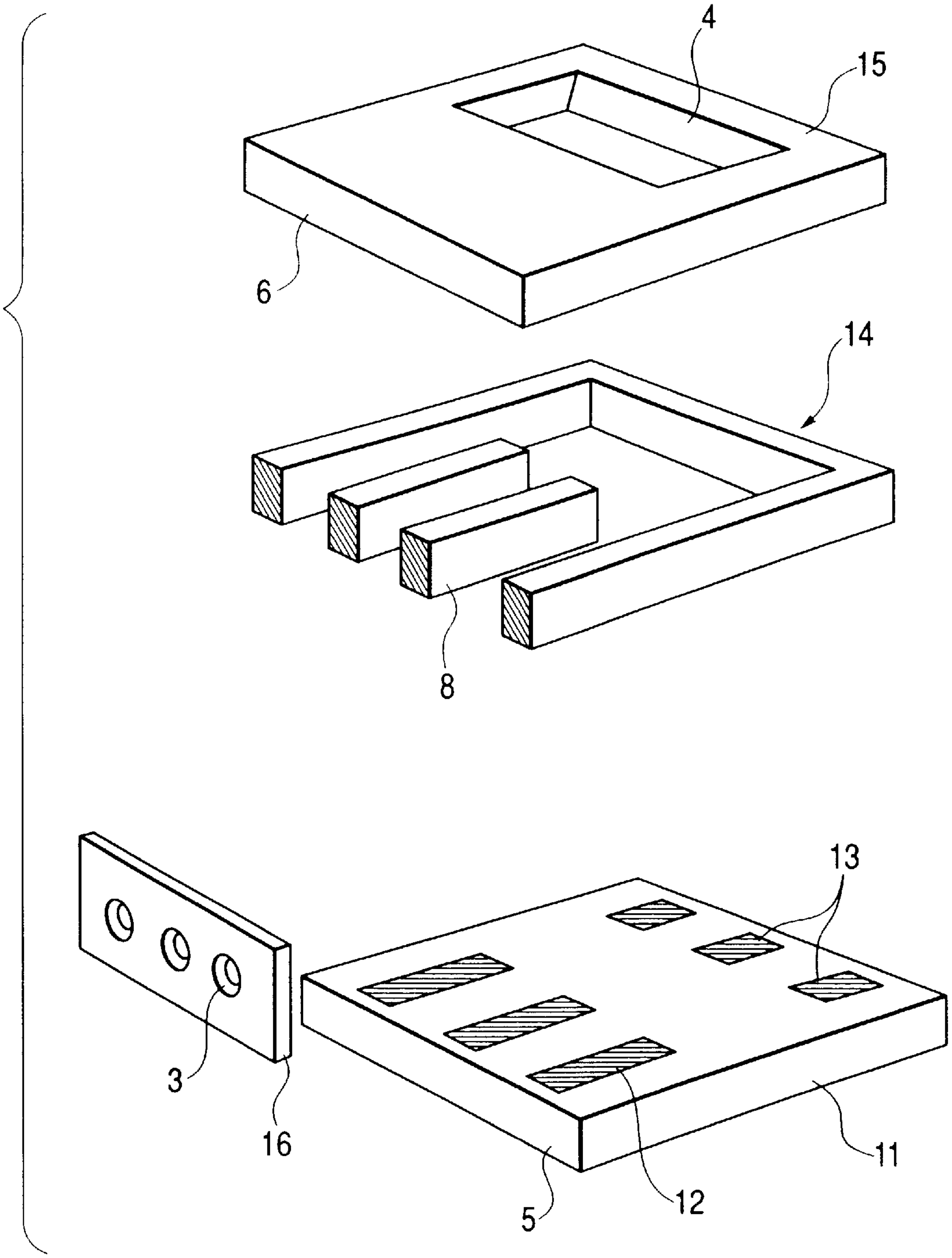
FIG. 3 is a perspective view showing the assembling the liquid discharge head shown in FIGS. 1 and 2.

FIG. 3 is a view showing the assembling of the liquid discharge head shown in FIGS. 1 and 2. As shown in FIG. 3, the element substrate 1 is provided thereon with heaters 12, a circuit for driving the heaters 12, and mounting pads 13 for introducing drives signals and electric energy from external circuits by wire bonding, TAB bonding or ACF connection. These components can be prepared by a general semiconductor process.

Then, on the above-mentioned substrate, there are prepared wall members 14 including liquid flow path walls 8. The semiconductor photolithographic technology can be applied for forming these wall members. Since these wall members generally have a width of about 5 to 15 μm and a height of about 10 to 100 μm, the applicable photolithographic technology is preferably a thick film technology, employed for example electroplating or magnetic heads. Also the material constituting the walls is required to have a high resolution and ink resistant property. An example of the material employable most advantageously is a photosensitive epoxy resist SU-8, supplied by Microchemical Corp., U.S.A. Such epoxy resin is not hydrolyzed even by the strongly alkaline ink for ink jet recording, and can provide an extremely sharp structure because of the generally low molecular weight of epoxy resin.

Such photosensitive epoxy resin can be any of those described in the U.S. Pat. Nos. 4,882,245, 4,940,651, 5,026,624, 5,102,772, 5,229,251, 5,278,010 and 5,304,457. Such liquid resin material can be patterned by coating and drying on a silicon substrate for example by spin coating, roller coating, spray coating etc., then pattern exposure with a common UV exposure apparatus, followed by PEB (post exposure bake) and development with developer.

The top plate 15 having the ink supply opening 14 can be prepared in various fine working methods. Most commonly there can be employed anisotropic etching process of silicon. In this process, on a silicon wafer having silicon oxide films on both surfaces, the silicon oxide film is patterned by a common photolithographic process and silicon is etched by aqueous alkali solution to form a penetrating hole. For the alkali of such aqueous solution, there can be advantageously employed inorganic alkali such as sodium hydroxide or potassium hydroxide, or organic alkali such as TMAH (tetramethyl ammonium hydroxide). Also there may be employed a process with grinding particles such as sandblasting, or a laser process employing for example a YAG laser.

Thus prepared top plate requires surface protection if the ink resistance is insufficient. It can be achieved for example by a method of coating an alkali resistant resin by solvent coating, or a method of forming a film of an inorganic material by evaporation, sputtering or CVD.

As the liquid discharge head of the present invention, employing an orifice plate consisting of silicon, intends to use components of a same linear expansion coefficient even in a long-sized head, there is most preferably employed a silicon top plate utilizing the aforementioned anisotropic etching process of silicon. Also for surface protection with satisfactory covering property and ink resistance, it is most preferable to form silicon nitride by LP-CVD (low pressure chemical vapor deposition) or silicon oxide by thermal oxidation.

The heater board bearing the wall members and the top plate are adhered for example with an adhesive material. There can be employed any general-purpose adhesive material, but an epoxy adhesive is most preferred in consideration of the high ink resistance. The epoxy resin can two-liquid type in which a main material and a hardening agent are separately supplied, or one-liquid type in which both are mixed in advance.

In case of two-liquid type, after the mixing of the main liquid and the hardening agent, the mixture is coated on the surface of the top plate prepared as explained in the foregoing or on the faces of the walls formed on the heater board for example by a printing method such as screen printing, a transfer method or a roller coating method, and the adhesive is hardened after the adjoining of the top plate and the heater board. Also in case one-liquid type, the adhesive is coated by the above-described method and is hardened under the predetermined condition after the adjoining. Also the photosensitive epoxy resin employed as the wall material can be used for adjoining, by coating with the above-described method and hardening by UV light irradiation.

Thus adjoined substrates are divided into individual chips by an ordinary dicer to obtain a part to which the orifice plate is to be adhered. In case of preventing intrusion of the dusts at the dicing operation into the ink flow paths, ordinary resin may be dissolved in solvent and filled into the flow paths prior to the dicing operation. For such resin, there may be employed resin which is soluble in ordinary solvent, has a relatively low molecular weight and is hard. Examples of most preferred resin includes phenolic resin such as cresol-novolac or phenol-novolac, and styrene resin such as polystyrene or poly-α-methylstyrene.

The chip prepared as explained in the foregoing and the orifice plate consisting of silicon can be adhered by coating adhesive material on the chip in advance, then adjoining the orifice plate with alignment and then hardening the adhesive material. The adhesive material and the coating method therefor can be same as those employed in the above-described adhesion of the top plate and the heater board. In this adhesion, however, the material and the coating method have to be selected more strictly, since, in this case, the eventual intrusion of the adhesive material into the ink flow path results in defective ink discharge. In case of employing the adhesive of two-liquid type, the hardening of the adhesive proceeds from the mixing of the main agent and the hardening agent with continuous change of viscosity in time, so that the strict control of flowability is extremely difficult. Also in case of dissolving and coating the adhesive of one-liquid type in solvent, there may result intrusion of the adhesive into the ink flow path or uneven coating of the adhesive by the heat applied in drying the solvent.

Most preferably there can be employed a method of coating and drying an adhesive material, which is solid at the room temperature, on a film such as of polyethylene terephthalate (PET) and transferring such adhesive to the adjoining face by thermal transfer. In order to achieve satisfactory transfer and satisfactory coating of the adhesive without forming the film thereof on the ink discharge ports, it is necessary to determine the process conditions such as the material of the adhesive, thickness thereof, transfer conditions (temperature, pressure and rubber hardness of the platen) etc.

In the above-described adhering operation of the orifice plate, in order to prevent positional aberration between the ink discharge ports formed in the orifice plate and the ink flow paths, the orifice plate may be provided in advance with a positioning protrusion as explained in the foregoing, whereby the satisfactory alignment can be achieved with a simple apparatus. Such protrusion also prevents intrusion of the adhesive into the ink discharge port, even if the viscosity of the adhesive is lowered at the hardening thereof.

After the adjoining of the orifice plate, a water-repellent agent is preferably coated on an ink discharging surface of the silicon orifice plate, in order to improve the ink resistance and to prevent wetting by the ink. The material and the coating method therefor can be same as those explained in the foregoing.

In using the liquid discharge head of the above-described configuration in a bubble jet printer which is a liquid discharge recording apparatus, in order to obtain ink discharge capable of an image of recently required photographic quality, it is necessary to discharge ink droplets in the amount of 2 to 50 picoliters at a frequency of about 10 kHz. For discharging the ink droplets with such amount and such discharge speed, the orifice plate 16 should be formed with a thickness of 20 to 100 micrometers and the discharge port 3 should be formed with a diameter of 15 to 30 micrometers.

The present invention has been attained by investigating the hole forming technology in the silicon substrate to be used as the orifice plate and the thinning technology of silicon. In the following there will be explained, with reference to FIGS. 4A1, 4A2, 4B, 4C1, 4C2, 4D1, 4D2, 4E1 and 4E2, a method of preparing the orifice plate shown in FIGS. 1 and 2, in the producing method for the liquid discharge head in the first embodiment of the present invention.

FIGS. 4A1, 4A2, 4B, 4C1, 4C2, 4D1, 4D2, 4E1 and 4E2 show a method of preparing the orifice plate 16 shown in FIGS. 1 and 2, wherein FIGS. 4A1, 4B, 4C1, 4D1 and 4E1 are cross-sectional views while FIGS. 4A2, 4C2, 4D2 and 4E2 are perspective views. Each view and description relating to the preparation of the orifice plate 16 correspond to a single liquid discharge head, namely a single chip, but in practice several ten to several hundred chips are positioned on a silicon wafer of 4 to 12 inches in diameter, so that plural orifice plates 16 are produced simultaneously from a silicon wafer. Also FIGS. 16A, 16B, 16C and 16D are cross-sectional views showing the flow of producing process, with emphasis on the shape of the hole to be formed in the orifice plate in the process shown in FIGS. 4A1, 4A2, 4B, 4C1, 4C2, 4D1, 4D2, 4E1 and 4E2.

At first there is prepared a silicon substrate 21 of a thickness of 625 $\mu$m as shown in FIGS. 4A1 and 4A2.

Then, on the surface of the silicon substrate 21, an Al layer is formed with a thickness of 8 $\mu$m by sputtering.

Then, on the Al layer on the silicon substrate 21, a resist material is coated with a thickness of 8 $\mu$m and is patterned in order to form, on the silicon substrate 21, discharge ports 3 shown in FIG. 1 and a groove-shaped plate dividing pattern for dividing the silicon substrate 21 into the individual chips. The resist was composed of Shipley SJR-5740, was coated with a coating apparatus CDS-600 supplied by Canon Inc. and was patterned by an exposure apparatus MPA-600 supplied by Canon Inc.

Then the patterned resist is used as a mask to dry etch the Al layer on the silicon substrate 21, thereby forming thereon an etching mask Al layer 22 bearing a pattern of openings 22*a* in positions corresponding to the discharge ports 3. This dry etching also forms, on the Al layer 22, grooves for dividing the silicon substrate 21, corresponding to the groove-shaped plate dividing pattern. The dry etching was conducted with chlorine gas and a dry etching apparatus NLD-800 supplied by Alvac Co. The Al layer was etched in such dry etching apparatus, with a power of 1000 W, a bias of 100 W and a pressure of 0.8 Pa.

Then the resist on the Al layer 22 is removed by ashing.

Figure 16A:
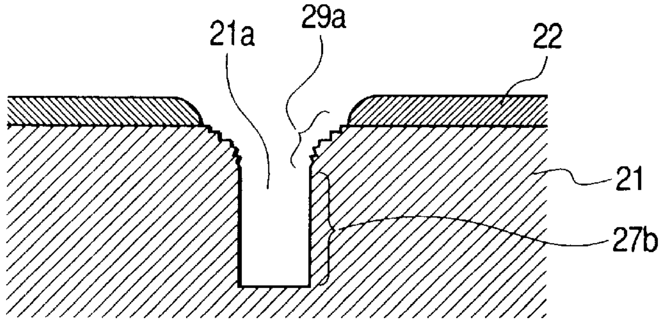
FIGS. 16A, 16B, 16C and 16D are cross sectional views showing the flow of the producing process, particularly in relation to the shape of the port formed in the orifice plate in the process steps shown in FIGS. 4A1, 4A2, 4B, 4C1, 4C2, 4D1, 4D2, 4E1 and 4E2.

Then the Al layer 22 is used as a mask to deep etch exposed portions of the silicon substrate 21 at the side of the Al layer 22 by dry etching ions 23 as shown in FIG. 4B, thereby forming recessed holes 21*a* in plural units with a depth of 50+5 to 50 $\mu$m in positions corresponding to the discharge ports 3 and a groove-shaped plate dividing pattern 21*b* for dividing the silicon substrate 21 into plural orifice plates, on the surface of the silicon substrate 21, as shown in FIGS. 4C1 and 4C2. The depth of the plate dividing pattern 21*b* is 50+5 to 50 $\mu$m as in the case of the holes 21*a*. Thus there is formed, on the surface of the silicon substrate 21, a pattern including the plate dividing pattern 21*b* and the plural holes 21*a*. This step was executed with a dry etching apparatus NLD-800 of Alvac Co. and $SF_6$ as the etching gas. In the dry etching apparatus, the silicon substrate 21 was etched with a power of 1000 W, a bias of 250 W and a pressure of 1.0 Pa to attain deep etching with a substantially straight cross-sectional shape of a depth of 50+5 to 50 $\mu$m. After the etching with $SF_6$, as shown in FIG. 16A, the hole 21*a* is provided, at the open end thereof, with a tapered portion 29*a* having a gradually decreasing cross section from the liquid flow path side to the discharge port side, but is composed of a straight portion 27*b*, having a substantially constant cross section, in most of the hole 21*a* including the bottom portion thereof. As the tapered portion 29*a* has a roughed surface, etching with $CF_4$ is further executed in order to smooth the surface of such tapered portion 29*a*, with a power of 1000 W, a bias of 50 W and a pressure of 1.0 Pa. After the etching with $CF_4$, the surface of the tapered portion 29*c* shown in FIGS. 16A to 16D, at the open end of the hole 21*a*, is made smooth.

With thus formed hole 21*a*, the silicon substrate 21 is thinned from the reverse side to the position of the straight portion 27*d* as will be explained later, whereby obtained is an opened port 21*a* with a substantially constant diameter regardless of the fluctuation in the removed thickness of the silicon substrate 21. As the bottom of the hole 21*a* is often not formed squarely, the silicon removing operation is not terminated in a state where the hole 21*a* is merely exposed by is preferably continued until the straight portion 27*b* is securely reached. In the present embodiment, such formation of the discharge ports in the silicon substrate 21 allows to obtain those having a uniform port diameter and a tapered shape showing gradually decreasing cross section toward the ink discharging side.

Figure 16B:
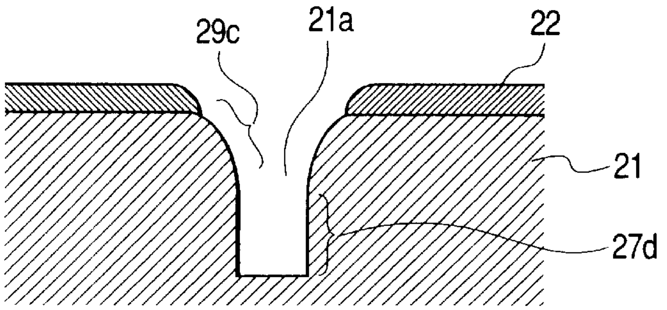

FIG. 16A shows the cross section after etching with $SF_6$, while FIG. 16B shows the cross section after etching with $CF_4$. After the etching with $SF_6$, as shown in FIG. 16A, the hole 21*a* is a tapered portion 29*a* at the open end, but is composed, in most of the hole 21*a* including the bottom thereof, of a straight portion 27 having a substantially constant shape along the direction of depth of the hole 21*a*. After the etching with $CF_4$, as shown in FIG. 16B, the open end of the hole 21*a* constitutes a tapered portion 29*c* wider than the tapered portion 29*a* shown in FIG. 16A while the remaining portion of the hole 21*a* constitutes a straight portion 27*d* with a constant cross section along the direction of depth. Consequently the straight portion 27*d* becomes narrower than the straight portion 27*b* shown in FIG. 16A.

The tapered shape of the discharge port 3, as shown in FIGS. 1 and 2, can be adjusted as desired, by varying the bias value.

Figure 16C:
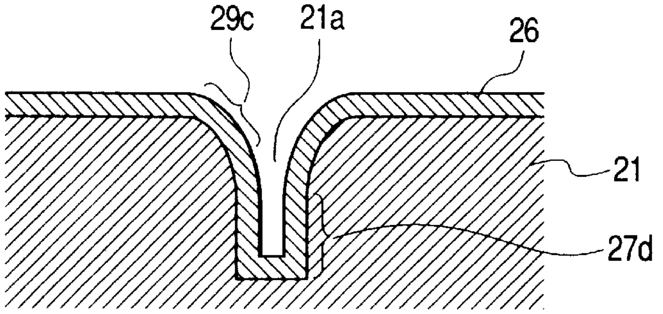

Then the Al layer 22 on the silicon substrate 21 is removed by a mixture of nitric acid, phosphoric acid and acetic acid, as shown in FIGS. 4C1 and 4C2. Then, in order to protect a surface, coming into contact with ink, of the silicon substrate 21, an SiN protective film is formed with a thickness of 2 $\mu$m by CVD, as shown in FIG. 16C, on the surface of the silicon substrate 21 at the side of the holes 21*a* and on the entire internal walls of the holes 21*a*.

Then, as shown in FIGS. 4D1 and 4D2, the surface of the silicon substrate 21 at the side of the holes 21*a* is adhered to a UV peelable tape, and the reverse surface of the silicon substrate 21 is ground and polished to thin the silicon substrate 21 to a thickness of 50 $\mu$m. In this operation, the silicon substrate 21 is adhered to the UV peelable tape 24, which is a back-fringing tape for maintaining, to a certain extent, the strength of the silicon substrate 21 in the grinding/polishing operation thereof. After the polishing of the reverse side of the silicon substrate 21, the UV peelable tape is peeled off by UV irradiation, whereby the bottom of each hole 21*a* is opened on the reverse surface of the silicon substrate 21 to constitute a penetrating hole, thereby forming a discharge port 3 in the silicon substrate 21, and the silicon substrate 21 is divided into plural orifice plates 16 according to the plate dividing pattern 21*b*. The thinning of the silicon substrate 21 may also be achieved by etching of the reverse surface of the silicon substrate 21.

Through the above-explained steps, there is obtained the orifice plate 16, provided by forming the discharge ports 3 in the silicon substrate 21, as shown in FIGS. 4C1 and 4C2.

Figure 16D:
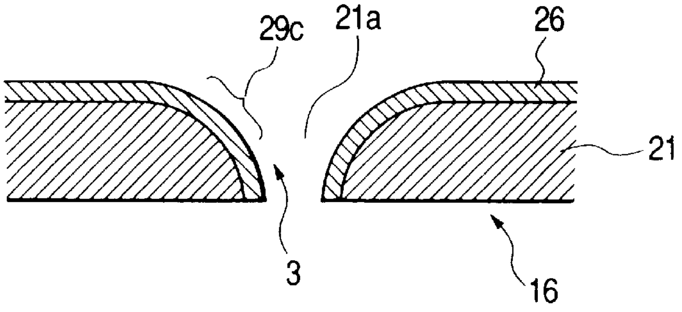

In this state, as shown in FIG. 16D, the opening of the discharge port 3 at the side of smaller cross section is formed in a part of the straight portion 27*d* close to the tapered portion 29*c* so that the front end portion of the discharge port 3 at the side of opening contains a certain straight portion of the constant cross section, whereby the discharge ports 3 can have a uniform port diameter. In case the entire discharge port 3 is to be tapered, the opening of the discharge port 3 at the side of smaller cross section may be positioned at the boundary between the tapered portion 29*c* and the straight portion 27*d* or provided in a position of the tapered portion 29*c* close to the straight portion 27*d*.

A liquid discharge head was prepared utilizing thus obtained orifice plate and executing assembly in the same manner as explained in the foregoing with reference to FIG. 3. The element substrate 11 and the top plate 15 were adhered to the orifice plate 16 with epoxy adhesive with a thickness of 2 $\mu$m.

The liquid discharge head prepared with the orifice plate 16 was subjected to a heat cycle test between −30° C. and +60° C., together with a comparative sample prepared with an orifice plate of polysulfone resin. While the comparative sample prepared with the polysulfone orifice plate showed peeling of the orifice plate for the orifice plate of a length of 50 mm or larger along the nozzle array, the head assembled with the silicon orifice plate, prepared according to the producing method of the present invention, did not show peeling of the orifice plate 16.

In the producing method for the liquid discharge head of the present embodiment, as explained in the foregoing, the orifice plate 16 having plural discharge ports 3 in the silicon substrate 21 is prepared by forming the recessed holes 21*a* thereon by etching and thinning the silicon substrate 21 from the reverse side thereof. It is thus rendered possible to produce a large-sized liquid discharge head of high reliability and to produce a large-sized liquid discharge head of high reliability also in case of constructing the liquid discharge head with the orifice plate consisting of silicon as explained in the foregoing.

Figure 17A:
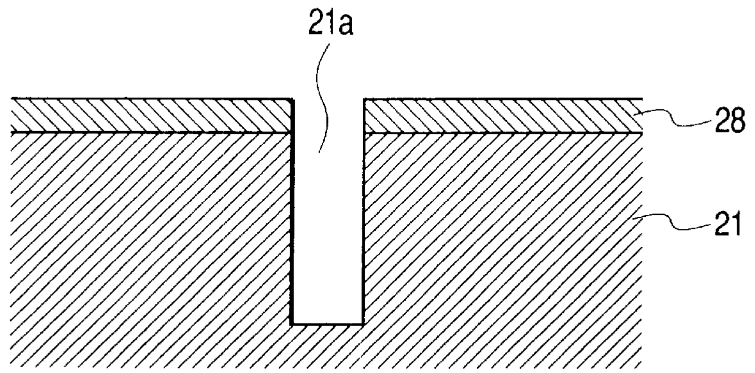
FIGS. 17A, 17B and 17C are cross-sectional views showing a variation of the producing method of the orifice plate explained in relation to FIGS. 4A1, 4A2, 4B, 4C1, 4C2, 4D1, 4D2, 4E1 and 4E2.

In the following there will be explained, with reference to FIGS. 16A, 16B, 16C and 16D, a variation of the method for producing the orifice plate explained in the foregoing with reference to FIGS. 4A1, 4A2, 4B, 4C1, 4C2, 4D1, 4D2, 4E1 and 4E2. FIGS. 16A, 16B, 16C and 16D are cross-sectional views showing a variation of the method for producing the orifice plate explained in the foregoing with reference to FIGS. 4A1, 4A2, 4B, 4C1, 4C2, 4D1, 4D2, 4E1 and 4E2. In comparison with the above-explained producing method, the producing method for the orifice plate to be explained with reference to FIGS. 17A, 17B and 17C is different principally in that, in the formation of the hole for the discharge port in the silicon substrate 21 by dry etching, an $SiO_2$ layer of a thickness of 2 $\mu$m is as the mask instead of the Al layer of thickness of 8 $\mu$m.

The silicon substrate 21 is dry etched, utilizing an $SiO_2$ layer 28 of a thickness of 2 $\mu$m formed on the surface of the silicon substrate 21 and having a predetermined pattern corresponding to the discharge port and the plate dividing pattern as a mask, whereby holes 21*a* are formed on the silicon substrate 21 for forming the discharge ports. In such dry etching step, the plural holes 21*a* are formed in the silicon substrate 21 by a cycled etching in which repeated are dry etching for 10 seconds with $SF_6$ as the etching gas and dry etching for 30 seconds with $CF_2$ as the etching gas.

The dry etching of the silicon substrate 21 with the $SiO_2$ layer 28 as the mask allows to form the holes 21*a* of a constant cross section along the direction of depth, on the silicon substrate 21.

Figure 17B:
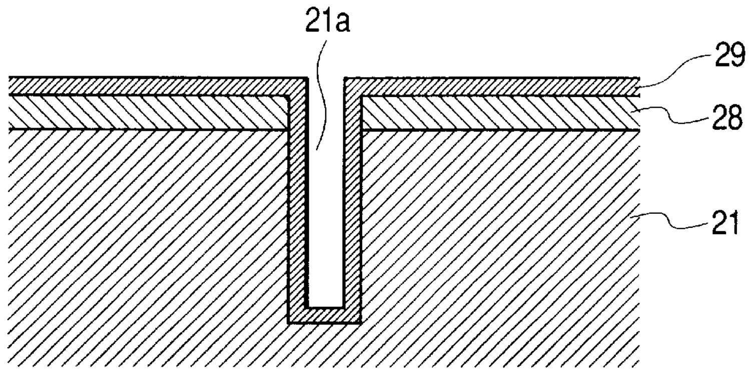
Figure 17C:
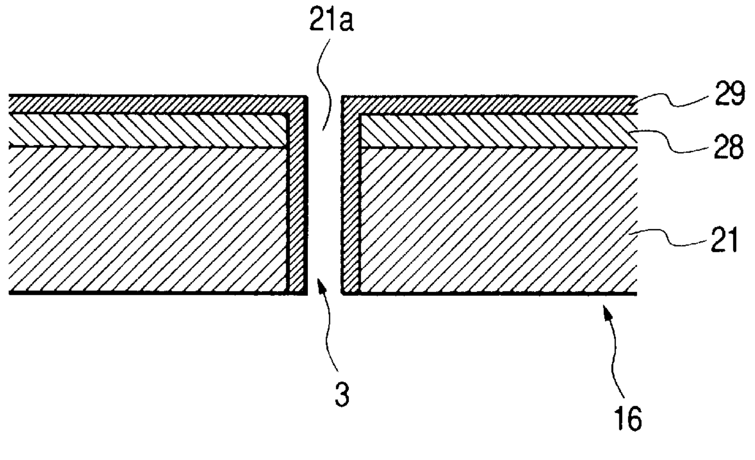

Then, as shown in FIG. 17B, an SiN protective film 29 is formed by CVD on the entire surface of the $SiO_2$ layer 28 and the entire internal wall of the holes 21*a*.

Then, as shown in FIG. 17C, the silicon substrate 21 is thinned from the reverse side thereof to cause the holes 21*a* to penetrate through the substrate 21, thereby forming the discharge ports 3 therein. The opening of the discharge port 3 is formed in an area, having a constant cross section, of the hole 21*a*. In this manner there is prepared the orifice plate 16 constructed by forming the discharge ports 3 in the silicon substrate 21.

The producing method for the orifice plate, explained with reference to FIGS. 17A, 17B and 17C, allows to form the holes 21*a* with a constant cross section along the direction of depth, and to form the opening of the discharge port 3 in a region where the cross section is constant. The liquid discharge head produced with the orifice plate prepared by the producing method shown in FIGS. 17A, 17B and 17C is excellent in reliability and allows an increase in the head dimention, like the liquid discharge head produced with the orifice plate prepared according to the producing method shown in FIGS. 4A1, 4A2, 4B, 4C1, 4C2, 4D1, 4D2, 4E1 and 4E2 and FIGS. 16A, 16B, 16C and 16D.

[Second Embodiment]

Figure 5:
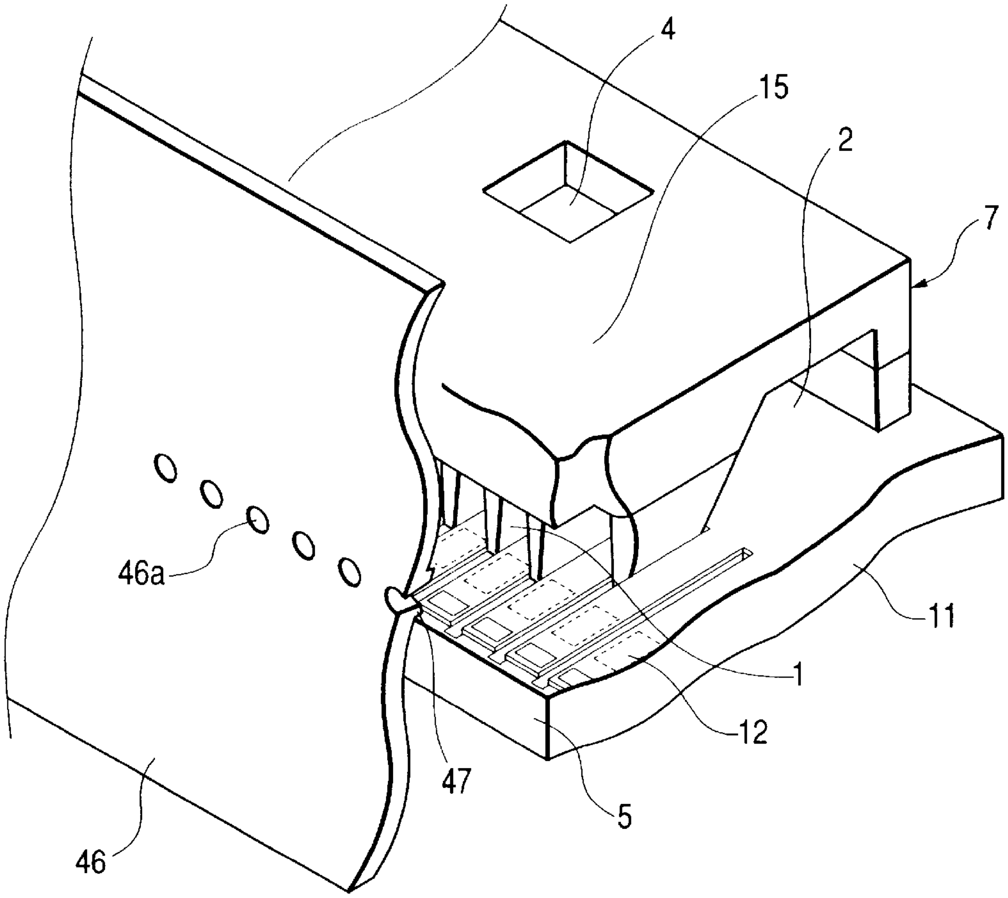
FIG. 5 is a perspective view showing a liquid discharge head in which applied is a method for producing the liquid discharge head, constituting a second embodiment of the present invention.
Figure 6:
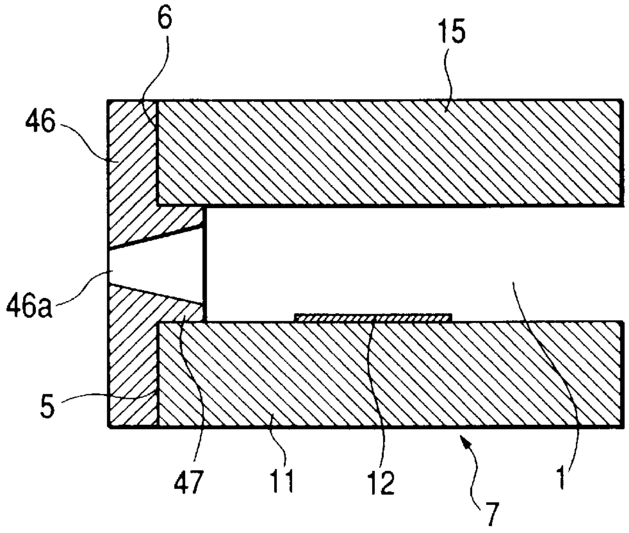
FIG. 6 is a cross-sectional view of the liquid discharge head shown in FIG. 5, along the liquid flow path thereof.

FIG. 5 is a perspective view showing a liquid discharge head in which applied is the producing method for the liquid discharge head in a second embodiment of the present invention, and FIG. 6 is a cross-sectional view of the liquid discharge head shown in FIG. 5, along the liquid flow path. In comparison with the liquid discharge head of the first embodiment, the liquid discharge head shown in FIGS. 5 and 6 is different only in the orifice plate and in that a projection part for fitting with the liquid flow path of the head main body is formed around the discharge port, on a surface of the orifice plate facing the head main body. In FIGS. 5 and 6, components same as those in the first embodiment are represented by numbers same as in the first embodiment. In the following there will be principally explained points different from the first embodiment.

In the liquid discharge head produced by the producing method for the liquid discharge head of the present embodiment, the orifice plate 16 employed in the first embodiment is replaced by an orifice plate 46 shown in FIGS. 5 and 6. The orifice plate 46 is composed of silicon, as in the case of the orifice plate 16 in the first embodiment. As in the case of the orifice plate 16, the orifice plate 46 is adjoined to the front end face of the head main body 7, namely to the adjoining face 5 of the element substrate 11 and the adjoining face 6 of the top plate 15, and is provided with plural discharge ports 46*a* respectively communicating with the flow paths 1. The orifice plate 46 is provided, around the discharge ports 46*a* on the adjoining face of the orifice plate 46 with the head main body 7, with independent projections 47 respectively corresponding to the discharge ports 46*a* as shown in FIGS. 5 and 6. The orifice plate 46 is adjoined to the adjoining faces 5, 6 in a state in which each projection enters and is fitted with the liquid flow path 1.

Figure 7:
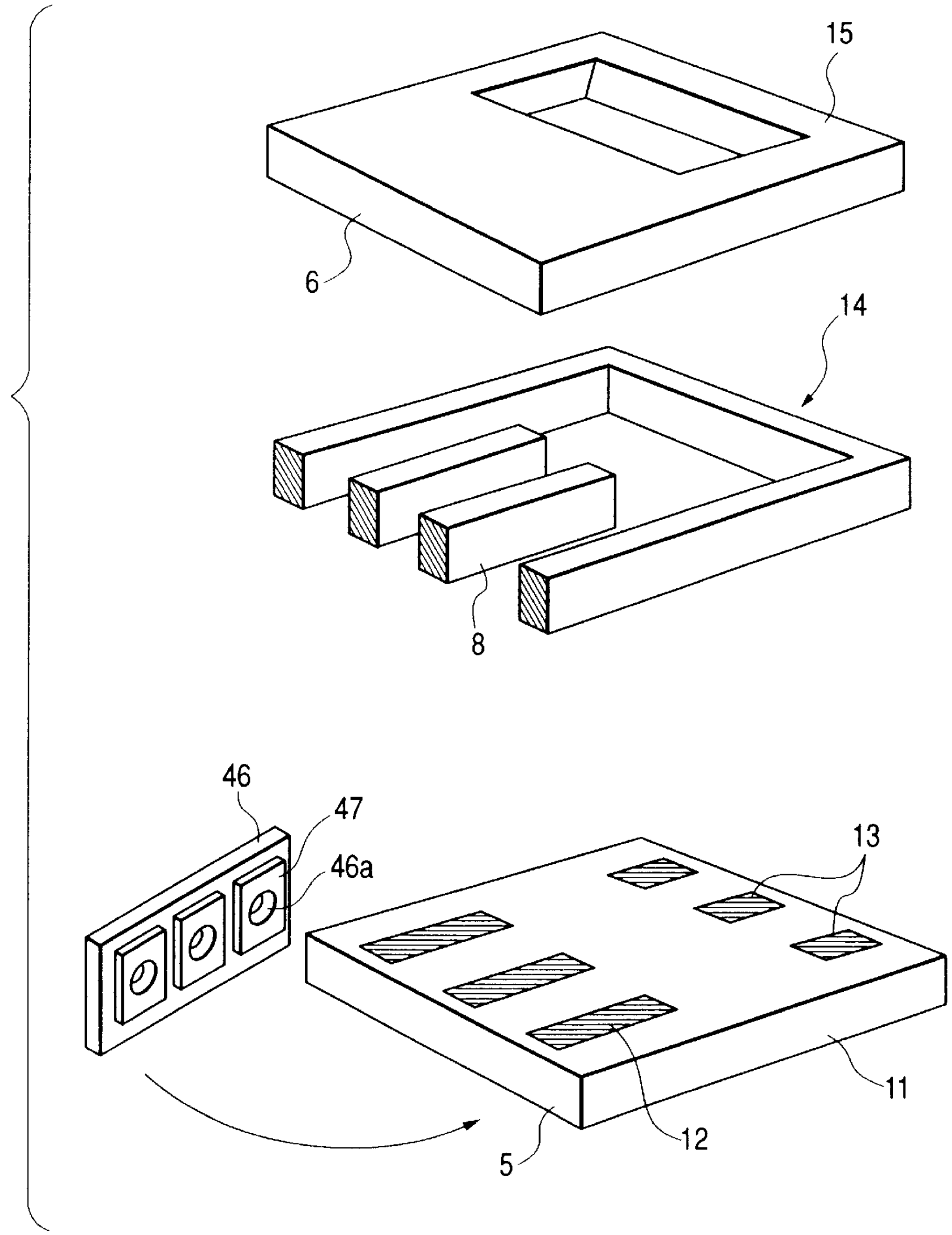
FIG. 7 is a perspective view showing the assembling of the liquid discharge head shown in FIGS. 5 and 6.

FIG. 7 is a view showing the assembling of the liquid discharge head shown in FIGS. 5 and 6. As shown in FIG. 7, wall members 14 including liquid flow path walls 8 are formed on the surface of an element substrate 11, and a top plate 15 including a supply opening 14 is adjoined to a face of the wall members 14 opposite to the element substrate 11. An orifice plate 46 is adhered to the front end face of the element substrate 11, wall members 14 and top plate 15. Recesses 47 of the orifice plate 46 are fitted into liquid flow paths 1 of the head main body 7, so that the alignment is accurate even if the epoxy adhesive is transferred to the top plate 15 and the element substrate 11, whereby a liquid discharge head excellent in mass producibility and reliability can be obtained.

In the following there will be explained, with reference to FIGS. 8A1, 8A2, 8B, 8C1, 8C2, BD1, 8D2, 8E1 and 8E2, a method of preparing the orifice plate shown in FIGS. 5 and 6, in the producing method for the liquid discharge head in the second embodiment of the present invention.

FIGS. 8A1, 8A2, 8B, 8C1, 8C2, 8D1, 8D2, 8E1 and 8E2 show a method of preparing the orifice plate 46 shown in FIGS. 5 and 6, wherein FIGS. 8A1, 8B, 8C1, 8D1 and 8E1 are cross-sectional views while FIGS. 8A2, 8C2, 8D2 and 8E2 are perspective views. Each view and description relating to the preparation of the orifice plate 46 corresponding to a single liquid discharge head, namely a single chip, but in practice several ten to several hundred chips are positioned on a silicon wafer of 4 to 12 inches in diameter, so that plural orifice plates 46 are produced simultaneously from a silicon wafer.

At first there is prepared a silicon substrate of a thickness of 625 $\mu$m. Then, on the silicon substrate, a resist material is coated with a thickness of 2 $\mu$m and is patterned in order to form projections 47 of a height of about 4 $\mu$m in positions corresponding to the discharge ports 46*a* and areas therearound. The resist was composed of Shipley SJR-5740, was coated with a coating apparatus CDS-600 supplied by Canon Inc. and was exposed by an exposure apparatus MPA-600 supplied by Canon Inc.

Then the patterned resist is used as a mask to dry etch the silicon substrate, thereby forming a silicon substrate 31 provided thereon with plural projections 31*b* as shown in FIGS. 8A1 and 8A2. Each projection 31*b* has a height of about 4 $\mu$m and is formed in a position corresponding to the discharge port 46*a* shown in FIGS. 5 and 6 and in an area therearound. The dry etching was conducted with $SF_6$ and a dry etching apparatus NLD-800 supplied by Alvac Co. The silicon substrate 31 was dry etched for 3 minutes in the dry etching apparatus with a power of 1000 W, a bias of 50 W and a pressure of 0.8 Pa.

Then, on a surface of the silicon substrate 31 at the side of the projections 31*b*, an Al layer is formed with a thickness of 8 $\mu$m by sputtering so as to cover the projections 31*b*.

Then, on the Al layer on the silicon substrate 21, a resist material is coated with a thickness of 8 $\mu$m and is patterned in order to from the discharge ports 46 shown in FIG. 5 and a groove-shaped plate dividing pattern for dividing the silicon substrate 31 into the individual chips. The resist was composed of Shipley SJR-5740, was coated with a coating apparatus CDS-600 supplied by Canon Inc. and was patterned by an exposure apparatus MPA-600 supplied by Canon Inc.

Then the patterned resist is used as a mask to dry etch the Al layer on the silicon substrate 31, thereby forming thereon an etching mask Al layer 32 bearing a pattern of openings 32*a* in positions corresponding to the discharge ports 46, as shown in FIGS. 8A1 and 8A2. This dry etching also forms, on the Al layer 32, grooves for dividing the silicon substrate 21, corresponding to the groove-shaped plate dividing pattern. The dry etching was conducted with chlorine gas and a dry etching apparatus NLD-800 supplied by Alvac Co. The Al layer was etched in such dry etching apparatus, with a power of 1000 W, a bias of 50 W and a pressure of 0.8 Pa.

Then the resist on the Al layer 32 is removed by ashing.

Then, as shown in FIG. 8B, the Al layer 32 is used as a mask to deep etch exposed portions of the silicon substrate 31 and the side of the Al layer 32 by dry etching ions 33, thereby forming recessed holes 31*a* in plural units with a depth of 70+5 to 50 $\mu$m in positions corresponding to the discharge ports 46 and a groove-shaped plate dividing pattern 31*b* for dividing the silicon substrate 31 into plural orifice plates, on the surface of the silicon substrate 31, as shown in FIGS. 8C1 and 8C2. The depth of the plate dividing pattern 31*b* is 70+5 to 50 $\mu$m as in the case of the holes 31*a*. Thus there is formed, on the surface of the silicon substrate 31, a pattern including the plate dividing pattern 31*b* and the plural holes 31*a*, and the remaining portions of the projections 31*b* constitute the projections 47 shown in FIGS. 5 and 6, whereby the plural projections 47 are formed on the silicon substrate 31. This step was executed with a dry etching apparatus NLD-800 of Alvac Co. and $SF_6$ as the etching gas. In the dry etching apparatus, the silicon substrate 31 was etched with a power of 1000 W, a bias of 200 W and a pressure of 1.0 Pa to attain etching of the silicon substrate 31.

Then the Al layer 32 on the silicon substrate 31 is removed by a mixture of nitric acid, phosphoric acid and acetic acid, as shown in FIGS. 8C1 and 8C2. Then, in order to protect a surface, coming into contact with ink, of the silicon substrate 31, an SiN layer (not shown) is formed with a thickness of 2 $\mu$m by CVD on the entire surface of the silicon substrate 31 at the side of the holes 31*a* and on the entire internal walls of the holes 31*a*.

Then, as shown in FIGS. 8D1 and 8D2, the surface of the silicon substrate 31 at the side of the holes 31*a* is adhered to a UV peelable tape 34, and the reverse surface of the silicon substrate 31 is ground and polished to thin the silicon substrate 31 until the thickness thereof including the projections 47 becomes 70 $\mu$m. In this operation, the silicon substrate 31 is adhered to the UV peelable tape 24 for maintaining, to a certain extent, the strength of the silicon substrate 31 in the grinding/polishing operation thereof. Such elimination of the reverse surface of the silicon substrate 31 causes, as shown in FIGS. 8E1 and 8E2, the bottom of each hole 21*a* to open on the reverse surface of the silicon substrate 31 to constitute a penetrating hole, thereby forming a discharge port 46*a* in the silicon substrate 31, and the silicon substrate 21 to be divided into plural orifice plates 46 according to the plate dividing pattern 31c. Through the above-explained steps, there is obtained the orifice plate 16, provided by forming the plural projections 47 and the plural discharge ports **46*a* in the silicon substrate 31**.

A liquid discharge head is prepared by adhering thus obtained orifice plate to the head main body, including the energy generation elements and the liquid flow paths. The adhesive is most preferably composed of epoxy resin which is provided with high ink resistance and a high adhesion strength. The epoxy adhesive can be a general two-liquid type or a one-liquid type that can be hardened at a high temperature. In hardening such adhesive, the orifice plate has to be pressed to the discharge element under a load, and may be displaced under the load application. Also the adhesive may overflow to clog the ink discharge port. In order to prevent such drawbacks, a projection is preferably formed around the discharge port on the adjoining face of the orifice plate. The positional aberration between the ink flow path and the discharge port at the adjoining operation can be prevented by fitting the projection into the ink flow path. Also the projection can prevent intrusion of the adhesive into the ink flow path, since the eventually overflowing adhesive forms a meniscus at such projection and is prevented from further flowing.

[Third Embodiment]

Figure 9A:
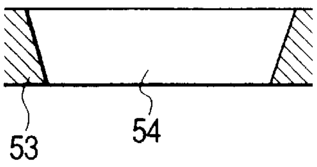
FIGS. 9A, 9B, 9C, 9D, 9E, 9F and 9G are views showing a method for producing the liquid discharge head, constituting a third embodiment of the present invention.
Figure 9B:
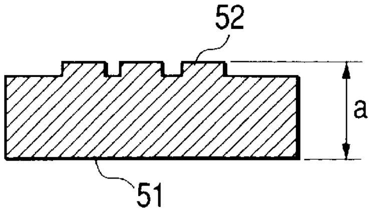
Figure 9C:
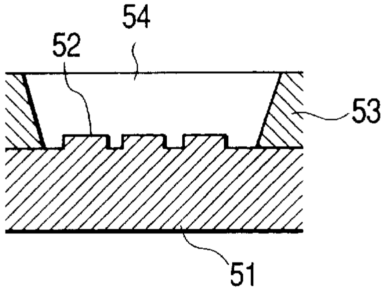
Figure 9D:
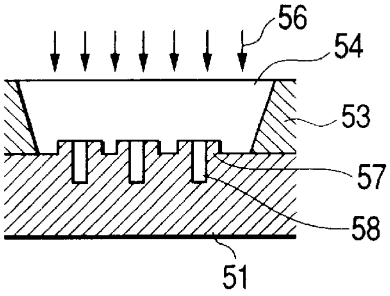
Figure 9E:
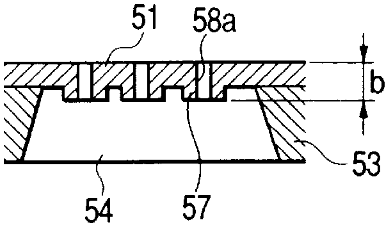
Figure 9F:
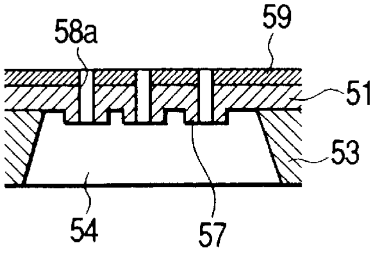
Figure 9G:
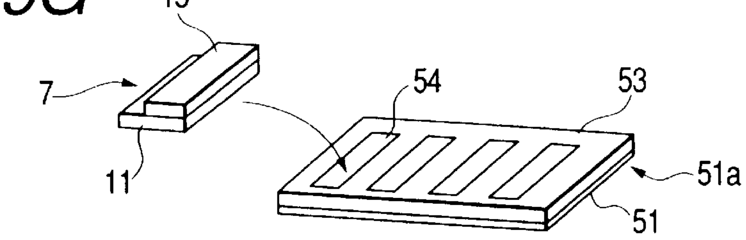
Figure 10:
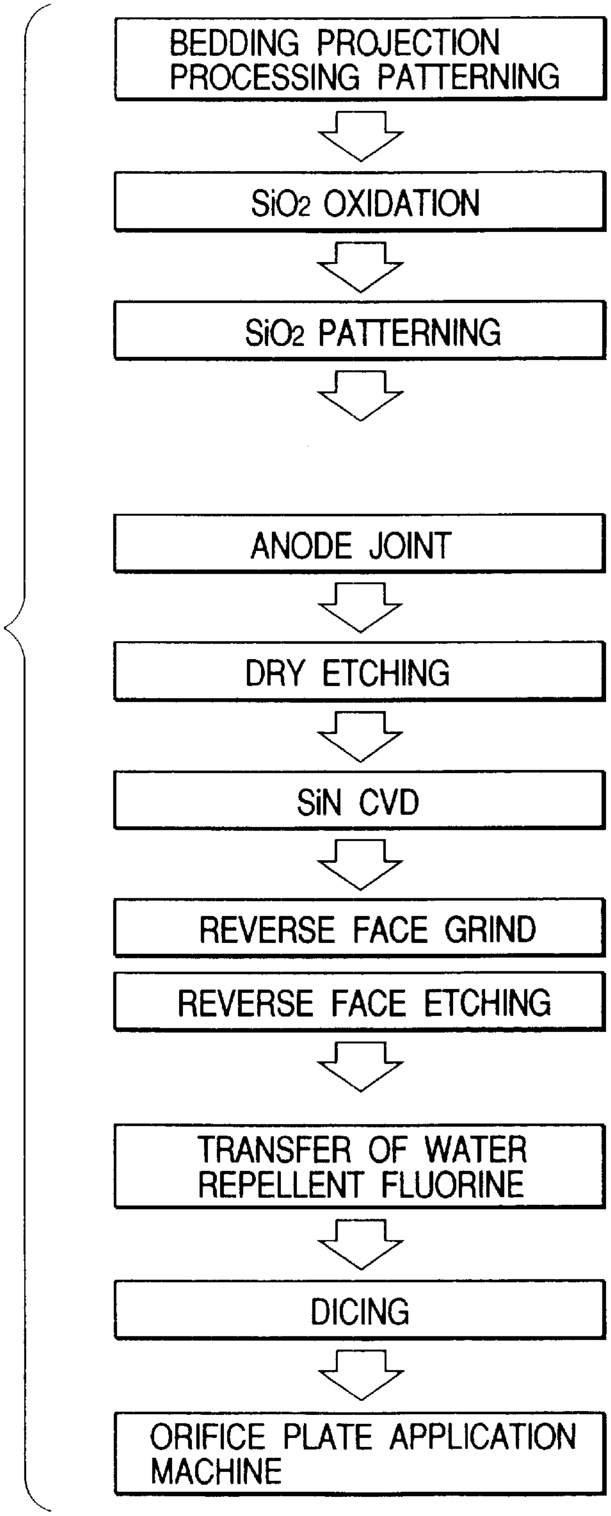
FIG. 10 is a flow chart showing the preparation process for the orifice plate, to be explained with reference to FIGS. 9A, 9B, 9C, 9D, 9E, 9F and 9G.

FIGS. 9A, 9B, 9C, 9D, 9E, 9F and 9G show a method for producing a liquid discharge head, as a third embodiment of the present invention, and FIG. 10 is a flow chart of the producing process of the liquid discharge head to be explained with reference to FIGS. 9A, 9B, 9C, 9D, 9E, 9F and 9G.

The producing method for the liquid discharge head of the present embodiment is an extension of the producing method of the second embodiment. As a general application, the ink jet recording is used in four-color recording with black, cyan, magenta and yellow or in six-color recording further including pale cyan and pale magenta. For mutual alignment of the placement of the ink dots of different colors, it is necessary to mutually align the nozzles of different colors, and it is desirable to align the nozzles of different colors within an orifice plate. In the producing method for the liquid discharge head of the present embodiment, the silicon substrate is reinforced, at the thinning operation thereof, with a frame member consisting of silicon or glass having a linear expansion coefficient similar to that of silicon, instead of the UV peelable tape employed in the first and second embodiments, thereby achieving mutual alignment of the nozzle arrays while realizing cost reduction.

At first there are prepared a plate-shaped frame member 53 having a hole 54 as shown in FIG. 9A, and a silicon substrate 51 having projections 52 as shown in FIG. 9B. The frame member 53 can be composed of silicon or glass having a linear expansion coefficient similar to that of silicon. The present embodiment will be explained by a case employing glass of a linear expansion coefficient similar to that of silicon.

For preparing the frame member 53, a glass wafer of a thickness of 625 μm is prepared and the hole 54 is patterned therein. The frame member 53 was composed of glass SG-2 supplied by Hoya Glass Co. and the hole 54 was formed by blasting.

For preparing the silicon substrate 51 having plural projections 52, there is at first prepared a silicon substrate of a thickness of 625 μm as in the second embodiment, and a resist material is coated thereon with a thickness of 2 μm. Then the resist is patterned in order to form projections 52 of a height of about 4 μm in positions corresponding to the discharge ports and areas therearound. As in the second embodiment, the resist was composed of Shipley SJR-5740, was coated with a coating apparatus CDS-600 supplied by Canon Inc. and exposed by an exposure apparatus MPA-600 supplied by Canon Inc.

Then the patterned resist is used as a mask to dry etch the silicon substrate, thereby forming a silicon substrate 51 provided thereon with plural projections 52 as shown in FIG. 9B. Each projection 52 has a height of about 4 μm and is formed in a position corresponding to the discharge port and in an area therearound. In the state shown in FIG. 9B, the silicon substrate 51 has a thickness a, including the projections 52, of 625 μm which is same as the original thickness of the silicon substrate. The dry etching was conducted, as in the second embodiment, with $SF_6$ as the etching gas and a dry etching apparatus NLD-800 supplied by Alvac Co. The silicon substrate 51 was dry etched for 3 minutes in the dry etching apparatus with a power of 1000 W, a bias of 50 W and a pressure of 0.8 Pa.

Then, after the removal by ashing of the resist used for forming the projections 52 on the silicon substrate 51, a thermal oxidation film ($SiO_2$, not shown) is formed with a thickness of 1 μm on a surface of the silicon substrate 51 at the side of the projections 52. Thus the thermal oxidation film is formed also on the entire end and lateral faces of the projections 52. Then, a resist material is coated on the entire surface of the thermal oxidation film on the silicon substrate 51 and is patterned in order to form openings in positions corresponding to the discharge ports. Then the patterned resist is used as a mask to dry etch the thermal oxidation film on the silicon substrate 51. Such patterning forms, in the thermal oxidation film on the silicon substrate 51, openings in positions corresponding to the discharge ports. Then thermal oxidation film is used as a mask in forming recesses for forming the discharge ports on the silicon substrate 51 by dry etching as will be explained later.

Then the resist used for patterning the thermal oxidation film on the silicon substrate 51 is removed by ashing.

Then, as shown in FIG. 9C, the frame member 53 is anodic adjoined to a surface of the silicon substrate 51 at the side of the projections 52, in such a manner that the projections 52 of the silicon substrate 51 are positioned within the hole 54 of the frame member 53. The adjoining of the silicon substrate 51 and the frame member 53 was executed by an apparatus SB-6 supplied by Carl Zuess Co. The anodic adjoining of the silicon substrate 51 and the frame member 53 was conducted in such adjoining apparatus for 1 hour at 350° C. The present embodiment employed anodic adjoining of the silicon substrate 51 and the frame member 53, but they may be adjoined instead by vacuum thermal adjoining or with an adhesive material.

Then, as shown in FIG. 9D, the above-mentioned thermal oxidation film (not shown) on the silicon substrate 51 is used as a mask for deep dry etching the exposed portions in the end faces of the projections 52 on the silicon substrate 51 by dry etching ions 56, thereby forming plural recessed holes 58 of a depth of 50+5 to 50 μm in positions corresponding to the discharge ports. As shown in FIG. 9D, a remaining portion of the projection 52 constitutes a projection 57 for fitting in the liquid flow path 1 of the head main body 7.

Then, as shown in FIG. 9E, the reverse surface of the silicon substrate 51 is ground and polished to thin the silicon substrate 51 until the thickness b thereof, including the projections 57, is reduced to 50 μm. Such thinning of the silicon substrate 51 causes, as shown in FIG. 9C, the bottom of each hole 58 to open in the reverse surface of the silicon substrate 51, thereby forming a penetrating hole, whereby discharge ports **58*a* are formed in the silicon substrate 51**.

Then an SiN protective film is formed with a thickness of 2 μm by CVD on the entire internal walls of the discharge ports 58*a*. The protective film in the present embodiment was composed of silicon nitride, but it may be replaced by a thermal oxidation film, silicon oxide or silicon carbide formed by CVD, or gold, platinum, Pd, Cr, Ta or W formed by electroplating or sputtering.

Then, as shown in FIG. 9F, a water-repellent fluorine film 59 is transfer laminated on a surface of the silicon substrate 51 opposite to the side of the projections 57, so as not to block the discharge ports 58*a*.

Then, as shown in FIG. 9G, there is cut off, by dicing, an orifice plate containing four nozzles arrays, corresponding to four liquid discharge heads or four element chips. In this manner there is obtained an orifice plate 51*a,* constructed by forming the projections 57 and the discharge ports 58*a* of four arrays on the silicon substrate 51.

Then, in order to adjoin a separately prepared head main body 7, obtained by adjoining an element substrate 11 and a top plate 15, to the adjoined member of the silicon substrate 51 and the frame member 53, epoxy resin is transferred onto a front end face of the head main body 7 where the open ends of the liquid flow paths 1 are located. Then the front end of the head main body 7 is directed to and inserted into the hole 54 of the adjoined member of the silicon substrate 51 and the frame member 53, whereby the head main body 7 is positioned with respect to the orifice plate 51*a*. The mutual alignment of the orifice plate 51*a* and the head main body 7 is achieved by fitting the projections 57 of the orifice plate 51*a* in the liquid flow paths 1 of the head main body 7.

In this manner the head main body 7 is adhered to the orifice plate 51*a,* with such mutual alignment therebetween.

Then the gap between the head main body 7 and the frame member 53 is filled with heat conductive resin containing fine metal particles and having high thermal conductivity. Thus the liquid discharge head having four nozzle arrays can be improved in the strength, while securing thermal conduction between the head main body 7 and the frame member 53.

Figure 11:
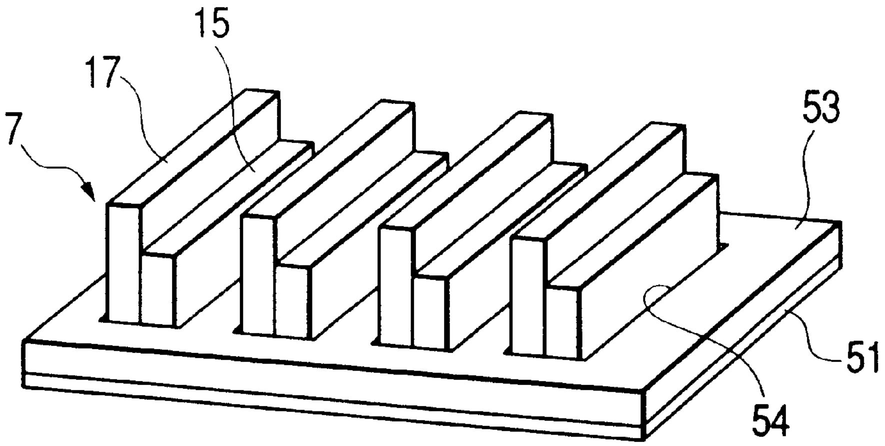
FIG. 11 is a perspective view showing a liquid discharge head, constituted by adhering four head main bodies to an adjoined member of an orifice plate and a frame member.

FIG. 11 is a perspective view of a liquid discharge head, constructed by adhering four head main bodies to the adjoined member of the orifice plate and the frame member. As shown in FIG. 11, the liquid discharge head can be prepared by inserting the head main body 7 in each of the four holes 54 of the frame member 53 and adjoining each head main body 7 to the orifice plate 51*a* in the above-described method.

Through the above-described steps, there is produced a liquid discharge head having four nozzles arrays which are integrated by alignment with an orifice plate.

[Fourth Embodiment]

FIGS. 12A1, 12A2, 12B, 12C1, 12C2, 12D, 12E1, 12E2, 12F, 12G1 and 12G2 are views showing steps of preparing an orifice plate of the liquid discharge head, in a method for producing the liquid discharge head in a fourth embodiment of the present invention, wherein FIGS. 12A1, 12B, 12C1, 12D, 12E1, 12F and 12G1 are cross-sectional views while FIGS. 12A2, 12C2, 12E2 and 12G2 are perspective views.

In comparison with the producing method of the first embodiment, the producing method of the present embodiment is different in that the protective film formed on the internal face of the discharge port at the preparation of the orifice plate is caused to protrude from a surface of the orifice plate opposite of the head main body thereby forming a projection.

At first there is prepared a silicon substrate 71 of a thickness of 625 μm as shown in FIGS. 12A1 and 12A2, and an Al layer is formed thereon with a thickness of 8 μm by sputtering.

Then, on the Al layer on the silicon substrate 71, a resist material is coated with a thickness of 8 μm and is patterned in order to form, on the silicon substrate 71, discharge ports and a groove-shaped plate dividing pattern for dividing the silicon substrate 71 into the individual chips.

Then the patterned resist is used as a mask to dry etch the Al layer on the silicon substrate 71, thereby forming thereon an etching mask Al layer 72 bearing a pattern of openings 72*a* in positions corresponding to the discharge ports, as shown in FIGS. 12A1 and 12A2. This dry etching also forms, on the Al layer 72, grooves for dividing the silicon substrate 71, corresponding to the groove-shaped plate dividing pattern.

Then the resist on the Al layer 72 is removed by ashing.

Then the Al layer 72 is used as a mask to deep etch exposed portions of the silicon substrate 71 at the side of the Al layer 72 by dry etching ions 73 as shown in FIG. 4B1, thereby forming recessed holes 71*a* in plural units with a depth of 70+5 to 50 μm in positions corresponding to the discharge ports and a groove-shaped plate dividing pattern 72*b* for dividing the silicon substrate 71 into plural orifice plates, on the surface of the silicon substrate 71, as shown in FIGS. 12C1 and 12C2. The depth of the plate dividing pattern 72*b* is 70+5 to 50 μm as in the case of the holes 71*a*. Thus there is formed, on the surface of the silicon substrate 71, a pattern including the plate dividing pattern 72*b* and the plural holes 71*a*.

Then the Al layer 72 on the silicon substrate 71 is removed by a mixture of nitric acid, phosphoric acid and acetic acid, as shown in FIGS. 12C1 and 12C2.

Then, in order to protect a surface, coming into contact with ink, of the silicon substrate 71, an SiN protective film 75 is formed with a thickness of 2 μm by CVD, as shown in FIG. 12D, on the surface of the silicon substrate 71 at the side of the holes 71*a* and on the entire internal walls of the holes 71*a*. The protective film in the present embodiment was composed of silicon nitride, but it may be replaced by a thermal oxidation film, silicon oxide or silicon carbide formed by CVD, or gold, platinum, Pd, Cr, Ta or W formed by electroplating or sputtering. This thickness of the protective film is preferably within a range of 0.5 to 2 μm, since an excessively thick protective film increases the stress, leading to breakage of the silicon substrate at the grinding/polishing operation thereof, and also since an excessive hydrophilic portion on the projection tends to cause deflected flight of the liquid droplet.

Then, as shown in FIGS. 12E1 and 12E2, the surface of the silicon substrate 71 at the side of the holes 71*a* is adhered to a UV peelable tape 74, and the reverse surface of the silicon substrate 71 is ground and polished to thin the silicon substrate 71 to a thickness of 70 μm. In this operation, the silicon substrate 71 is adhered to UV peelable tape 74, in order to maintain, to a certain extent, the strength of the silicon substrate 71 in the grinding/polishing operation thereof. Such grinding of the reverse surface of the silicon substrate 71 causes, as shown in FIG. 12F, each hole 71*a* to open on the reverse surface of the silicon substrate 71 to constitute a penetrating hole, whereby discharge ports 71*b* are formed in the silicon substrate 71, and the silicon substrate 71 is divided into plural orifice plates 76 according to the plate dividing pattern 72*b*.

Then, as shown in FIGS. 12G1 and 12G2, the surface layer of the silicon substrate 71, on the side not covered by the protective film 75, is removed by alkaline etching with KOH, whereby the protective film 75 is made to protrude from such surface of the silicon substrate 71 to constitute a projection 75*a*. In this manner there is obtained the orifice plate 76 to be adjoined to the head main body of the liquid discharge head, and having a discharging portion constructed by the protective film 75 constituting the internal wall of the discharge port 71*b* and protruding from the surface of the orifice plate 75.

Figure 13:
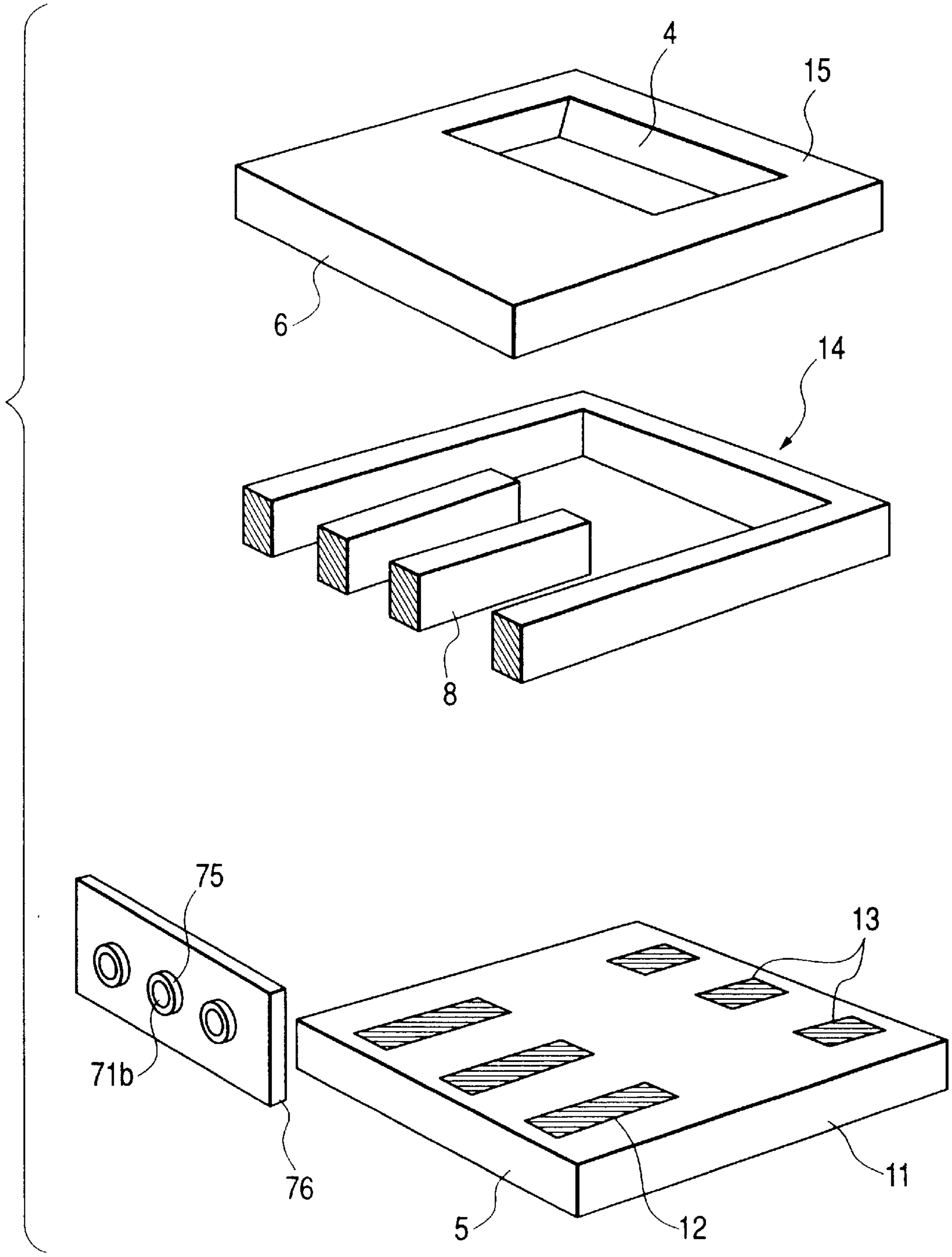
FIG. 13 is a perspective view showing the assembling of the liquid discharge head, employing the orifice plate prepared by the steps shown in FIGS. 12A1, 12A2, 12B, 12C1, 12C2, 12D, 12E1, 12E2, 12F, 12G1 and 12G2.

FIG. 13 is a perspective view showing the assembling of the liquid discharge head, employing the orifice plate 76 prepared according to the steps shown in FIGS. 12A1, 12A2, 12B, 12C1, 12C2, 12D, 12E1, 12E2, 12F, 12G1 and 12G2. After the orifice plate 76 is prepared by the above-described steps, it is adjoined to the head main body 7 consisting of the element substrate 11, wall members 14 and top plate 15 as shown in FIG. 13 to obtain the liquid discharge head. In this operation, the orifice plate 76 is adjoined in such a manner that a discharge portion 75*a* is positioned opposite to the head main body 7.

In the liquid discharge head employing such orifice plate 76, the presence of the SiN protective film 75, being repellent to ink, dispenses with the cleaning operation around the nozzles by blade wiping of the head surface including the discharge ports, thereby simplifying the structure of the main body of the liquid discharge recording apparatus and the control sequence thereof.

FIGS. 14A1, 14A2, 14B1 and 14B2 are views showing a variation of the method for producing the orifice plate explained in the foregoing with reference to FIGS. 12A1, 12A2, 12B, 12C1, 12C2, 12D, 12E1, 12E2, 12F, 12G1 and 12G2. The producing method for the orifice plate, to be explained with reference to FIGS. 14A1, 14A2, 14B1 and 14B2 is same as the above-described producing method up to the step shown in FIGS. 12G1 and 12G2, after which a water-repellent film is formed on the silicon substrate 71 constituting the orifice plate 76.

After the step shown in FIGS. 12G1 and 12G2, a water-repellent material 79 is dispense coated by a dispenser 78, as shown in FIGS. 14A1 and 14A2, on the exposed surface of the silicon substrate 71 constituting the orifice plate 76, namely the entire surface of the silicon substrate 71 constituting the discharge portion 75*a* by the protrusion of the protective film 75. Thus, there is formed, as shown in FIGS. 14B1 and 14B2, a water-repellent film 79*a* on the entire surface of the silicon substrate 71 including the areas around the projections 75*a*.

The liquid discharge head constituted with the orifice plate 76 bearing the water-repellent film 79*a* avoids ink deposition around the discharge ports on the discharge face of the orifice plate 76, so that the deflected ink discharge resulting from such ink deposition is difficult to occur.

Such producing method of the orifice plate allows to form the water-repellent film also around the discharge ports, thereby providing a liquid discharge head in which the deflected ink discharge resulting from the ink deposition around the nozzles is difficult to occur.

In the producing method for the liquid discharge head of the present embodiment, the surface of the orifice plate 76 at the side of the head main body is not provided with the projections for entering and fitting with the liquid flow paths of the head main body, but the producing method of the second embodiment may be applied to the present embodiment to produce a liquid discharge head having projections for fitting with the liquid flow paths of the head main body and also having a protruding structure of the protective film constituting the internal walls of the discharge ports.

[Fifth Embodiment]

Figures 18, 19A, 19B, 19C, 19D, 19E, 19F, 19G, 19H, 19I:
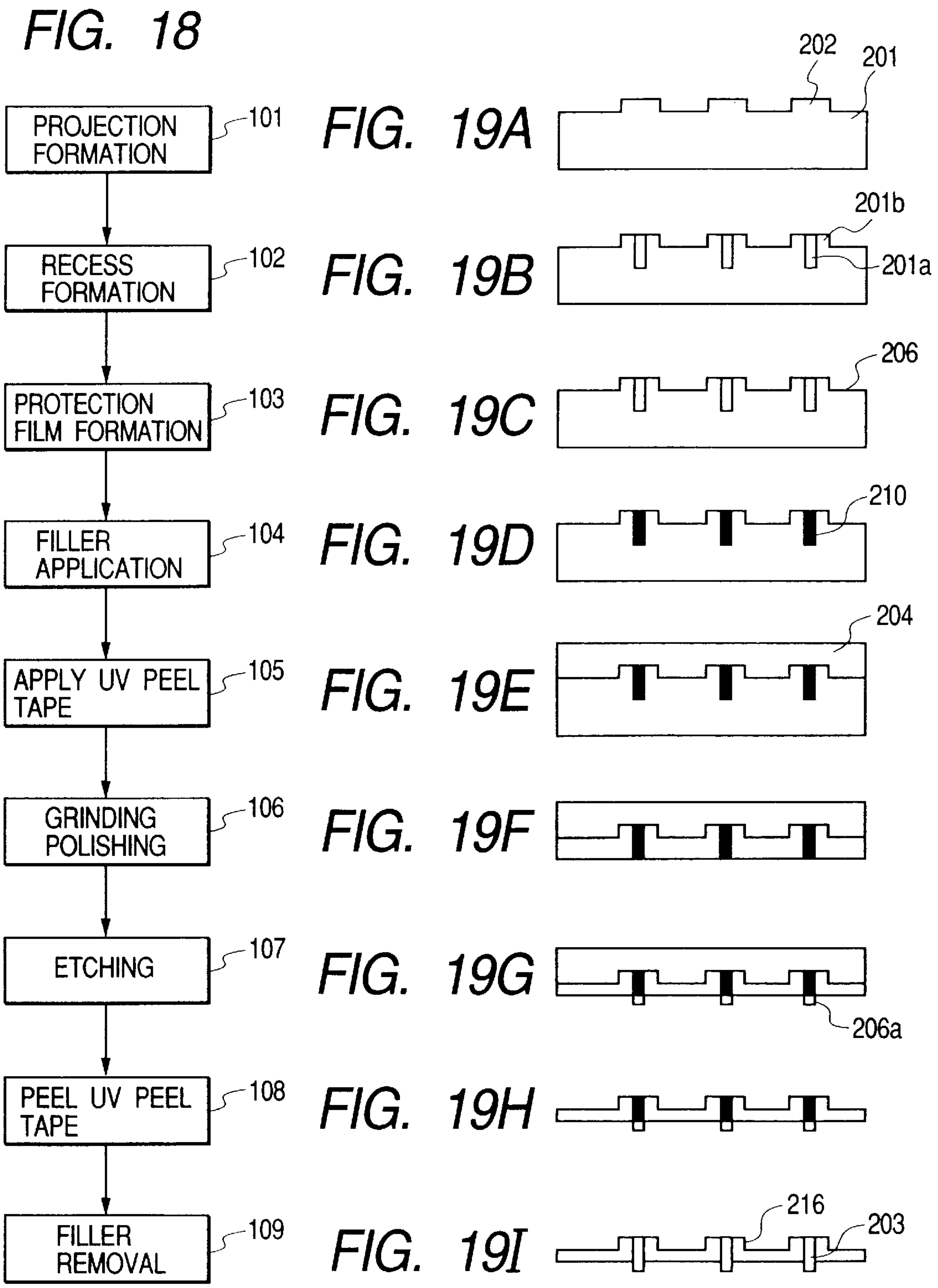
FIG. 18 is a flow chart of the producing steps of the orifice plate in which applied is a method for producing the liquid discharge head in a fifth embodiment of the present invention.
FIGS. 19A, 19B, 19C, 19D, 19E, 19F, 19G, 19H and 19I are views showing a method for producing a method for producing the orifice plate in which applied is a method for producing the liquid discharge head in a fifth embodiment of the present invention.

FIGS. 18 and 19A to 19I are views showing a producing method for the liquid discharge head in a fifth embodiment of the present invention, wherein FIG. 18 is a flow chart of the producing method of an orifice plate.

The present embodiment is different from the foregoing embodiments in that, after the formation of the recess or after the formation of the protective film on the silicon lateral wall of the recess, such recess is filled. In the foregoing embodiments, the ink discharge may become unstable, by the intrusion of the grinding material in the penetrating hole or by chipping in the grinding operation. In the present embodiment, such phenomena can be easily prevented with particular control in the thinning step of the silicon substrate, by filling the recesses.

In the following, there will be explained, with reference to FIGS. 18 and 19A to 19I, the producing method for the liquid discharge head of the present embodiment.

At first, on a silicon substrate 201, there are formed projections (101 in FIG. 18, FIG. 19A) for forming projections 201*b* for avoiding positional aberration.

The projection 201*b* can be formed by forming a projection 202 by dry etching on silicon, prior to the formation of a recess 201*a*. Such projection can be easily formed by etching with fluorine-containing gas, utilizing ordinary positive-working photoresist as a mask. The projection 202 advantageously has a height of 1 to 10 μm. For fitting with the ink flow path, there is generally preferred a fitting gap of 0.5 to 3 μm, though it is dependent on the adjoining precision of the orifice plate adjoining apparatus.

Then dry etching is executed to form a recess 201*a* to constitute the ink discharge port. In this operation, there is collectively formed a plate dividing pattern corresponding to the external shape of the plate (102 in FIG. 18, FIG. 19B).

The formation of the recesses 201*a* and the plate dividing pattern can be achieved by forming a mask member by patterning, and by dry etching with fluorine-containing gas as etchant, utilizing thus patterned mask. The mask pattern can be composed of an ordinary resist, a metal such as Al, Ta or W, silicon oxide or silicon carbide. The etching depth is required to be larger than the thickness of the finally formed orifice plate, in order that a penetrating hole constituting the discharge port is formed by the silicon thinning operation. Naturally, an unnecessarily deep etching results in deterioration of the shape of the recess, an increase in the tact time but an etching depth very close to the thickness of the orifice plate may result in an unpenetrating hole because of the loading effect.

The etching depth is preferably a value of 5 to 50 μm in addition to the depth of the discharge port. Thus, if the final thickness of the orifice plate is designed as 50 μm, the depth of the recess is preferably in a range of 55 to 100 μm.

The etching may be executed by ordinary reactive ion etching (RIE), or by electron cyclotron (ECR) etching, magnetron etching or induction coupled etching for high-speed etching.

Most preferred is an ICP-RIE recess forming process called Bosch process, in which the ICP etching and protective film deposition on the lateral wall of the etched portion are repeated at high speed.

In such etching process, etching is executed with an etchant enabling high-speed etching such as $SF_6$, $CF_4$ or $NF_3$, then a fluorine-containing polymer is formed on the lateral wall by deposition gas such as $CHF_3$, $C_2F_4$, $C_2F_6$, $C_2H_2F_2$ or $C_4H_8$, and these operations are repeated whereby the recesses and the plate dividing pattern are formed with a high aspect ratio at a high speed. The etching apparatus utilizing such etching process is commercialized by Alcatel Co. and STS Co.

Then, a lateral wall protective film 206 is formed on the interior of the discharge port, in order to improve the ink resistance (103 in FIG. 18, FIG. 19C).

The ink for ink jet recording is often alkaline, and may etch silicon. The silicon surface has to be protected in case such ink is to be used. The silicon surface has to be protected on the lateral wall of the trench formed by RIE and on the surface having the discharge port. The lateral wall of the trench can be protected, after the RIE step, by forming an ink-resistant protective film by an ordinary film forming method. Such protective film can be formed for example by thermal oxidation, CVD, sputtering or plating, and can be composed of a silicon compound such as silicon oxide or silicon nitride, or a metal such as gold, platinum, Pd, Cr, Ta or W. Most preferred is a method of forming silicon oxide by thermal oxidation or a method of forming silicon nitride by LP-CVD, in consideration of a low cost and a high covering power. Such protective film preferably has a thickness in a range of 0.1 to 5 $\mu$m.

Then a filling material is filled in the recess (104 in FIG. 18, FIG. 19D).

The penetrating hole, being formed in the back grinding, etching or grinding operation, may be subjected to intrusion of the grinding material or chipping in the grinding operation, thus resulting in unstable liquid discharging operation. For preventing such phenomena, there can be adopted a method of filling the recess 201*a* with a filling material 210, after the formation of the recess or after the formation of the silicon wall protecting film on the recess. A simplest method consists of introducing resin by dissolving in solvent, and thinning the silicon after the solvent is removed. The filling resin preferably has a softening temperature exceeding the temperature generated at the grinding or polishing operation, a hardness capable of preventing chipping and is easily removable by dissolving after such steps. In general, there can be advantageously employed phenolic resin such as phenol-novolak resin, cresol-novolak resin or polyvinylphenol, styrene resin such as polystyrene or poly-$\alpha$-methylstyrene, or acrylic resin such as polymethyl methacrylate. Such resin can be easily filled into the recesses 201*a* by dissolving in solvent, coating on the silicon wafer for example by spin coating and drying for example in an oven. If bubbles remain in the recesses 201*a* in such operation, the coating operation may be executed in vacuum.

Instead of such resin, a metal may also be used for filling. Such metal can be filled in for example by sputtering, evaporation or CVD, and can be removed by dissolving for example in an acid after the thinning operation of silicon. The metal to be filled is advantageously a hard metal such as Ta, W, Cr or Ni.

Then a UV peelable tape constituting a back grinding tape is adhered (105 in FIG. 18, FIG. 19E). The back grinding tape is used as a supporting member for maintaining the strength of the silicon substrate at the grinding/polishing operation thereof.

Then the reverse surface of the silicon substrate 201 is ground to effect thinning thereof (106 in FIG. 18, FIG. 19F), and then is polished to remove the chipped portions of the protective film and to further thin the silicon substrate (107 in FIG. 18, FIG. 19F) whereby obtained is the orifice plate 216 having the penetrating holes for constituting the ink discharge ports.

The thinning of the silicon substrate 201 is generally executed by a method, after adhering the UV peelable tape 204 on the surface, of grinding the reverse surface at a high speed (back grinding) and then eliminating the microcracks, generated in the grinding operation, by polishing or etching in order to improve the strength of the thin silicon. The back grinding is generally executed by rough grinding with a grindstone of #100 to #500 and finish grinding with a grindstone of #1500 to #3000. Also in case of forming a thin orifice plate of a thickness not exceeding 100 $\mu$m, it is common to remove the microcracks, generated in the grinding operation, by polishing or etching, since such microcracks deteriorate the strength. The polishing can be executed with ordinary alumina, silica or cerium oxide. Also the etching can be executed with fluoric acid, a mixture of fluoric acid and nitric acid, or an alkaline solution such as of sodium hydroxide, potassium hydroxide or tetramethyl ammonium hydrate. Such silicon thinning process is incorporated in a mass production apparatus commercialized for example by Okamoto Machinery Co. or Tokyo Oka Co.

Then the area around the discharge port is etched to cause the protective film 206 to protrude, thereby forming a projection 206*a* (108 in FIG. 18, FIG. 19G).

A projection 206*a* can be formed around the ink discharge port, by selecting a specified material for protecting the lateral wall of the recess formed on silicon in the thinning operation of the silicon substrate 201 and executing etching after the thinning operation. Such projection 206*a* avoids defective ink discharge resulting from the intrusion of the ink droplets deposited on the surface including the discharge ports and also avoids intrusion of the protective resin into the discharge port at the coating step of such protective resin on the discharge port surface.

For example, in case silicon nitride is employed as the protective material for the lateral wall of the recess, etching with fluoric acid or with a mixture of fluoric acid and nitric acid only leaves silicon nitride as a projection after the thinning operation. Also in case the lateral wall is protected by thermal oxidation of silicon, a projection 206*a* consisting of silicon oxide can be formed by etching with alkaline solution. The projection 206*a* preferably has a height of 0.5 to 10 $\mu$m, though it is related with the thickness of the protective film. An excessively large height of the projection 206*a* results in chipping, in the wiping operation with the blade in the actual use of the liquid discharge head.

Then the UV peelable tape is peeled off by UV irradiation (109 in FIG. 18, FIG. 19H), and the filling material 210 is removed by dissolving (210 in FIG. 18, FIG. 19I) whereby the aforementioned orifice plate 306 is completed. The UV irradiation was conducted with an apparatus UVM-200 supplied by Furukawa Denko Co., with an irradiation of 2 J/cm$^2$.

Then there is formed a film for protecting the surface including the ink discharge ports.

The protection of the surface including ink discharge ports may be achieved either by forming a film of an ink-resistant material by the aforementioned methods after the thinning operation of silicon, or by coating an ink-resistant material on such surface after the liquid discharge head is prepared by adhering the orifice plate. Most preferably a water-repellent film is formed by coating fluorine resin or silicone resin to achieve ink-repellent property, whereby satisfactory recording can be realized since the surface containing the ink discharge ports is not wetted with ink.

Such fluorine resin can be Sitop supplied by Asahi Glass Co. or Sifel supplied by Shinetsu Chemical Industries Co. Such protective resin can be advantageously coated by a transfer method or a dispense method. In the transfer method, it is common to coat solution of the above-mentioned resin by a solvent coating method such as spin coating or bar coating on a resin or rubber sheet and transferring such coated film by applying such sheet to the surface including the discharge ports. Also heat may be applied if the transfer is difficult.

The most advantageous resin is Sitop mentioned above. It can be advantageously diluted with CT-Solv 180 which is the solvent for such resin to a concentration of 1 to 5 wt. %, then formed into a thin film by spin coating on a silicon wafer adhered with a silicon rubber sheet and is transferred in this state.

Finally a liquid discharge head is prepared by adjoining the orifice plate 216, prepared in the above-described steps, to a separately prepared head main body, formed by adjoining an element substrate and a top plate.

The filling material 210 may also be removed after the adjoining the orifice plate to the head main body.

Such producing method allows to easily avoid chipping in the grinding operation or intrusion of the grinding material in the penetrating holes in the polishing operation, without particular control in the thinning step of the substrate, thereby providing a liquid discharge head with stable liquid discharging operation.

[Sixth Embodiment]

FIGS. 20 and 21A to 21D are views showing a method for producing the liquid discharge head, in a sixth embodiment of the present invention.

Figure 20:
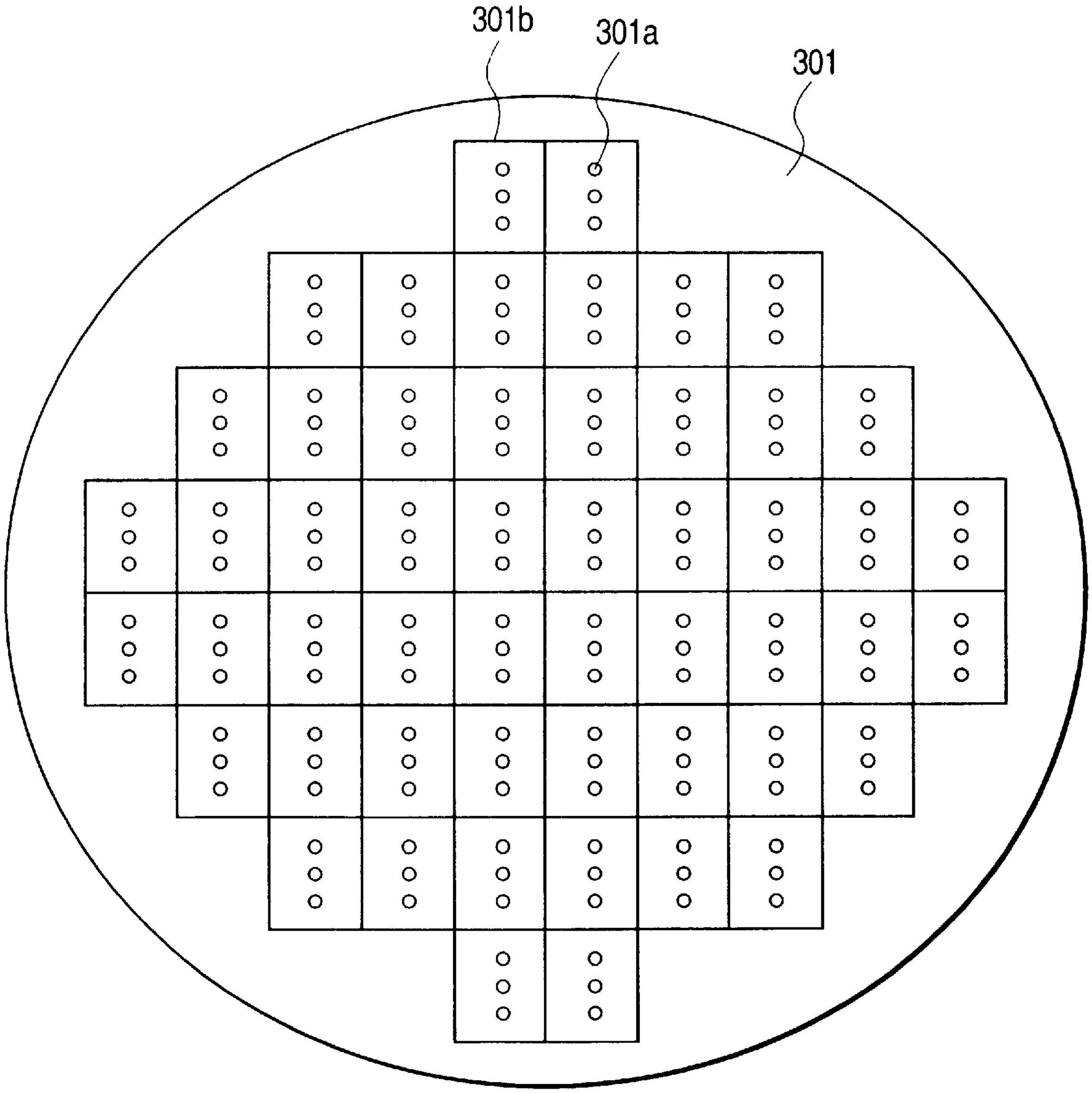
FIG. 20 is a view showing a plate dividing pattern in a producing method of the liquid discharge head in a sixth embodiment of the present invention.

In comparison with the first embodiment, the present embodiment is different in the use of a silicon wafer 301 as the silicon substrate and in that a plate dividing pattern 301*b* is formed excluding an external periphery portion of the silicon wafer 301 (cf. FIG. 20).

The present embodiment utilizes, in dividing the silicon wafer 301, so-called "prior dicing" method disclosed in the Japanese Patent Application Laid-Open No. 9-213662. The "prior dicing" method consists of forming grooves, along grid-patterned dicing lines positioned on a wafer bearing semiconductor elements, by a dicing operation from the surface bearing the semiconductor elements to a predetermined depth, then adhering a back grinding tape on the surface, bearing the semiconductor elements, of the wafer and grinding and polishing the reverse surface of the wafer until such grooves are reached, thereby dividing the wafer into the individual chips.

The present embodiment is same as the "prior dicing" process in that the plate dividing pattern (grooves) is formed on the wafer and in that the wafer is divided by grinding from the reverse surface thereof after the formation of the plate dividing pattern. Also the adhesion of the back grinding tape on the surface bearing the plate dividing pattern is similar to the adhesion of the UV peelable tape in the present embodiment, for maintaining the strength of the wafer.

In the "prior dicing" process, however, since the plate dividing pattern is formed by dicing, the grooves are formed to the external periphery of the wafer. On the other hand, the external peripheral area of 2 to 5 mm of a silicon wafer is outside the effective area thereof, and is an area in which the wafer has a smaller thickness and is not used for forming patterns. Consequently the divided silicon in such external peripheral portion is only weakly supported by the back grinding tape and may result in chip cracking to damage other satisfactory chips. Also after the thinning operation of the wafer, the orifice plates (chips) are supported only by the sheet, so that the wafer is lowered in rigidity and is bent in the conveying or in insertion into a cassette, thereby eventually leading to a trouble in conveying operation or a cracking by collision. Besides, the external shape of the orifice plate is limited because the dicing operation can only provide linear plate dividing pattern.

The present embodiment is to provide means for resolving such drawbacks in the "prior dicing" process. The present embodiment is different from the "prior dicing" process in that the plate dividing pattern is formed by etching and that the plate dividing pattern is not formed in the external periphery portion of the wafer, thereby resolving the drawbacks in the "prior dicing" process. More specifically, in the present embodiment, the plate dividing pattern, being formed by dry etching, can be formed in an arbitrary manner, providing a larger freedom in the external shape of the orifice plate. Also because the plate dividing pattern is formed by dry etching, the external periphery portion of the wafer can be left free of the plate dividing pattern, whereby the external periphery portion may be maintained intact after the thinning operation. Therefore, in the grinding and polishing operations, the external periphery portion of the wafer can be protected and can be prevented from fluctuation in the thickness resulting from a decrease in the thickness therein, or chipping or cracking of the orifice plate in the external periphery poriton as encountered in the "prior dicing" process, whereby the dimentional precision and production yield can be improved. Also since the external periphery portion remains after the thinning operation, the wafer is supported by such external periphery portion and the UV peelable tape. Thus the wafer after the thinning operaiton has a higher rigidity and shows a smaller bending in the conveying of wafer or the insertion thereof into the cassette, thereby preventing troubles in conveying or cracks by collision. Furthermore, the dry etching can collectively form the recesses constituting the discharge ports after the thinning operation and the plate dividing pattern, thereby reducing the number of steps and the manufacturing cost.

In the following the present embodiment will be explained with reference to the accompanying drawings.

Figure 21A:
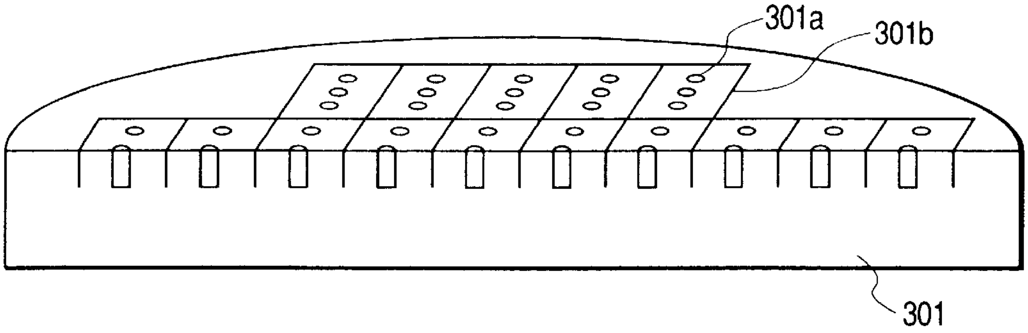
FIGS. 21A, 21B, 21C and 21D are views showing a method for producing the orifice plate in which applied is the producing method of the liquid discharge head of the sixth embodiment of the present invention.
Figure 21B:
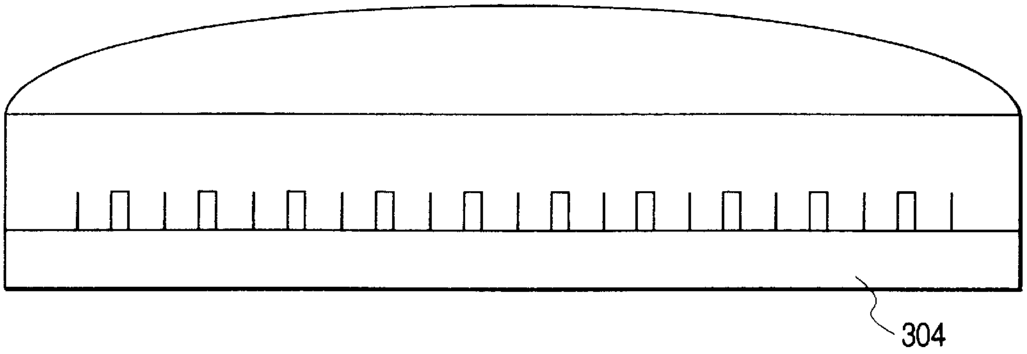

At first there is prepared a silicon substrate 301 of a thickness of 625 $\mu$m as shown in FIG. 21A, and, on the surface of the silicon substrate 301, an Al layer is formed with a thickness of 8 $\mu$m by sputtering.

Then, on the Al layer on the silicon substrate 301, a resist material is coated with a thickness of 8 $\mu$m and is patterned in order to form, on the silicon substrate 301, discharge ports 3 and a groove-shaped plate dividing pattern 301*b* for dividing the silicon substrate 301 into the individual chips. The resist was composed of Shipley SJR-5740, was coated with a coating apparatus CDS-600 supplied by Canon Inc. and was patterned by an exposure apparatus MPA-600 supplied by Canon Inc. The exposure amount was 1 J/cm$^2$ and the development was executed with exclusive developer.

Then the patterned resist is used as a mask to dry etch the Al layer on the silicon substrate 301, thereby forming therein an etching mask Al layer bearing a pattern of openings in positions corresponding to the discharge ports 3 on the silicon substrate 301 as shown in FIG. 21A. This dry etching also forms, on the Al layer, grooves for dividing the silicon substrate 301, corresponding to the groove-shaped plate dividing pattern 301*b*. The dry etching was conducted with chlorine gas and a dry etching apparatus NLD-800 supplied by Alvac Co. The Al layer was etched in such dry etching apparatus, with a power of 1000 W, a bias of 100 W and a pressure of 0.8 Pa.

Then the resist on the Al layer is removed by ashing.

Then the Al layer is used as a mask to deep etch exposed portions of the silicon substrate 301 at the side of the Al layer by dry etching ions 23 thereby forming recessed holes 301*a* in plural units with a depth of 70+5 to 50 $\mu$m in positions corresponding to the discharge ports 303 and a groove-shaped plate dividing pattern 301*b* for dividing the silicon substrate 301 into plural orifice plate, on the surface of the silicon substrate 301, as shown in FIG. 21A. The etching gas was composed of $C_3F_8$ mixed with oxygen of 5 vol. %, and the dry etching was conducted with a power of 1000 W, a bias of 150 W and a gas pressure of 5 Pa. The depth of the plate dividing pattern 301*b* is 70+5 to 50 μm as in the case of the holes 301*a*. Thus there is formed, on the surface of the silicon substrate 301, a pattern including the plate dividing pattern 301*b* and the plural holes 301*a*. The plate dividing pattern 301*b* is formed excluding the external peripheral portion of the silicon wafer 301, as shown in FIGS. 20 and 21A to 21D.

The mask in the above-explained step was composed of the Al layer, but a $SiO_2$ layer may be used instead as explained with reference to FIGS. 17A to 17C in the first embodiment. Thus the plate dividing pattern 301*b* and the plural holes 301*a* are formed and an SiN protective film 26 is formed with a thickness of 2 μm by CVD through a process similar to that explained with reference to FIGS. 16A to 16D or 17A to 17C.

Figure 21C:
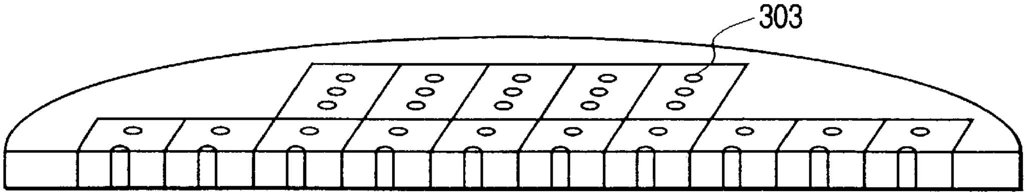
Figure 21D:
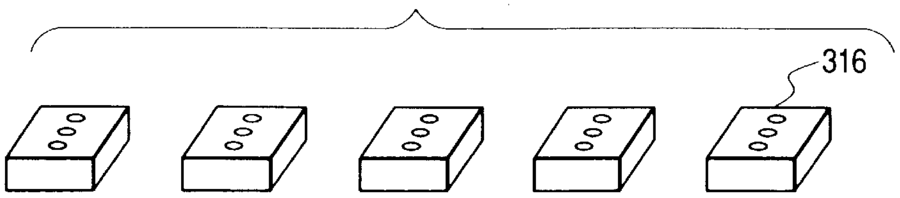

Then, as shown in FIG. 21D, the surface of the silicon substrate 301 at the side of the holes 301*a* is adhered to a UV peelable 304, and the reverse surface of the silicon substrate 301 is grond and polished to thin the silicon substrate 301 to a thickness of 50 μm. In this operation, the silicon substrate 301 is adhered to the UV peelable tape 304, which is a back-grinding tape for maintaining, to a certain extent, the strength of the silicon substrate 301 in the grinding/polishing operation thereof. The back grinding tape is generally composed of a polyolefin base film and an acrylic adhesive coated thereon, in which the acrylic adhesive is either a UV peelable type or a UV insensitive type. The UV peelable type, having a strong chip supporting power at the back grinding operation and showing a decrease in the adhesive power by the subsequent UV irradiation, provides an advantage that the chips can be easily picked up. The present embodiment employed such tyep FS-3323-330 supplied by Furukawa Denko Co. The thickness of the UV peelable tape 304 is preferably about 200 μm, since an excessively small thickness results dificient rigidity, incapable of sufficiently supporting the wafer 304 after the thinning operation, thus eventually leading to troubles in the wafer conveying operation, while an excessively large thickness results in insufficient UV irradiation for peeling.

The grinding operation of the reverse surface of the silicon wafer 301 causes, as shown in FIG. 21C, the bottom of each hole 21*a* to open in the reverse surface of the silicon wafer 301 to form a penetrating hole, whereby the discharge ports 3 are formed in the silicon wafer 301 and the silicon wafer 301 is divided into plural orifice plates 316 according to the plate dividing pattern 301*b*. The thinning of the silicon wafer 301 may also be achieved by etching the reverse surface thereof.

Finally, the UV peelable tape 304 is peeled off by UV irradiation as shown in FIG. 21D, whereby the wafer is collectively separated into the plural orifice plates 316. The UV irradiation was conducted with an apparatus UVM-200 supplied by Furukawa Denko Co., with an irradiation amount of 2 $J/cm^2$.

Through the above-described process, there are collectively produced orifice plates 316, prepared by forming the discharge ports 3 in the silicon wafer 301, as shown in FIG. 21D.

In the following there will be explained a step of conveying the silicon wafer 301 after the dividing step thereof.

Figure 22A:
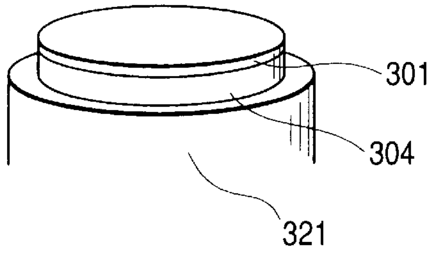
FIGS. 22A, 22B, 22C and 22D are views showing the conveying of a silicon wafer in the producing method of the orifice plate explained in relation to FIGS. 21A, 21B, 21C and 21D.
Figure 22B:
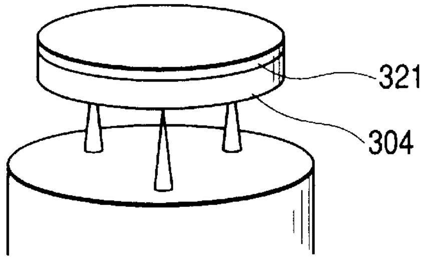

After the silicon wafer 301 is divided by thinning on a stage 321 with a vacuum chuck as shown in FIG. 22A, the vacuum of the stage is terminated and the push-up pins are elevated to lift the silicon wafer with the UV peelable tape 304, as shown in FIG. 22B.

Figure 22C:
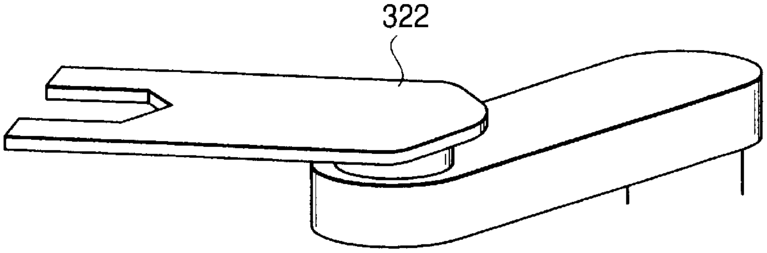
Figure 22D:
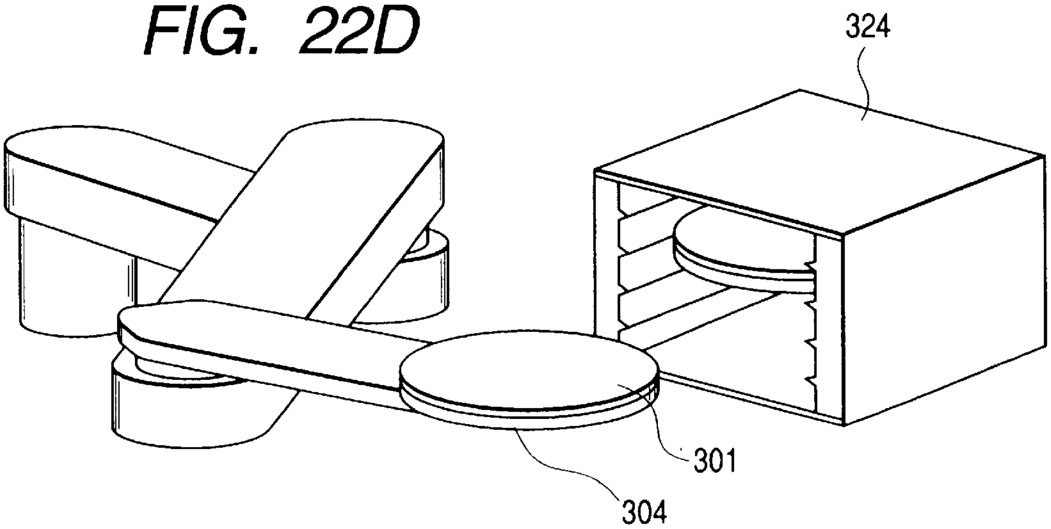
Figure 23:
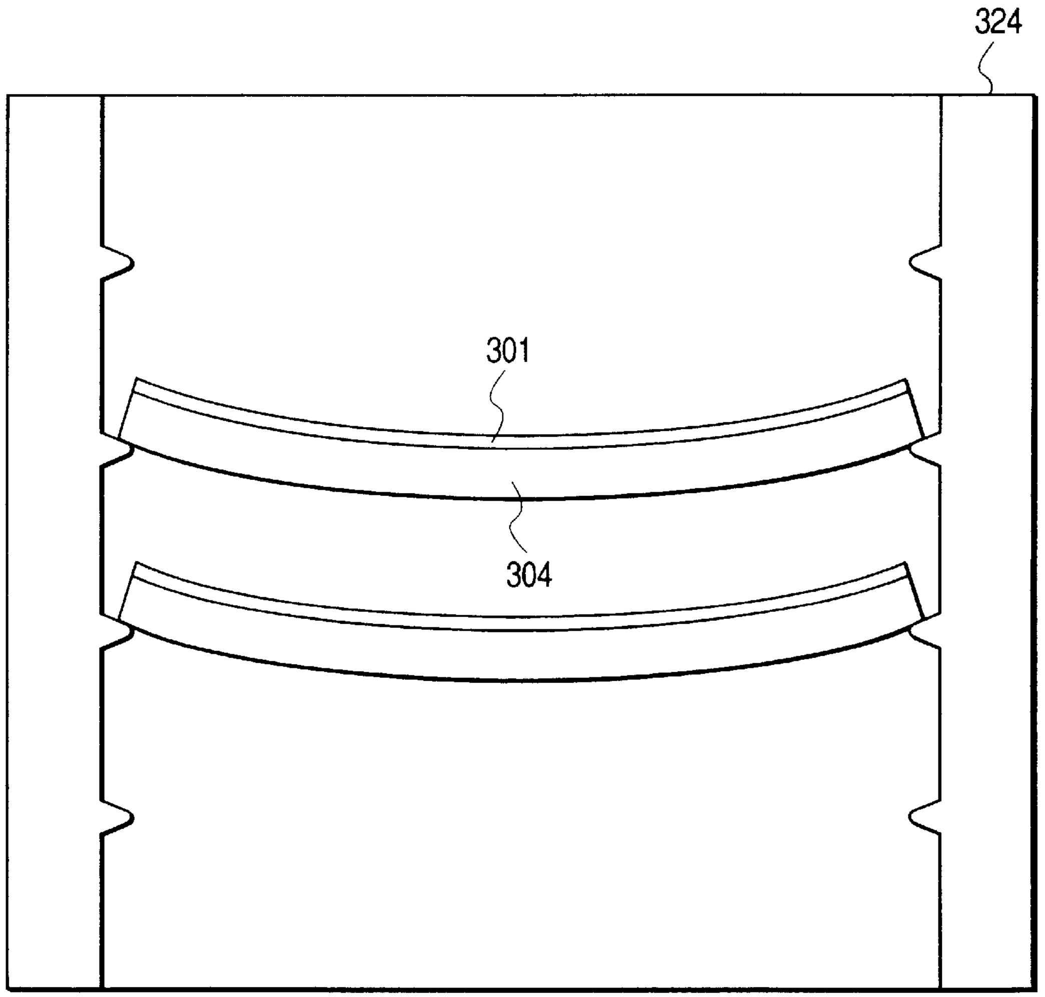
FIG. 23 is a view showing the conveying of the silicon wafer in the producing method of the orifice plate explained in relation to FIGS. 21A, 21B, 21C and 21D.

Then a robot arm 322 as shown in FIG. 22C is activated to transfer the silicon wafer with the UV peelable tape 304 to a cassette tray as shown in FIG. 22D, whereby the silicon wafer with the UV peelable tape 304 is housed in a cassette tray 324 as shown in FIG. 23.

The transfer of the silicon wafer 301 with the UV peelable tape 304 to the cassette tray 324 may also be executed by a process to be explained in the following with reference to FIGS. 24A to 24C.

Figure 24A:
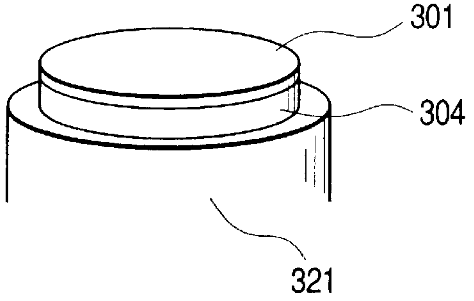
FIGS. 24A, 24B and 24C are views showing a variation of the conveying of the silicon wafer in the producing method of the orifice plate explained in relation to FIGS. 22A, 22B, 22C, 22D and 23.
Figure 24B:
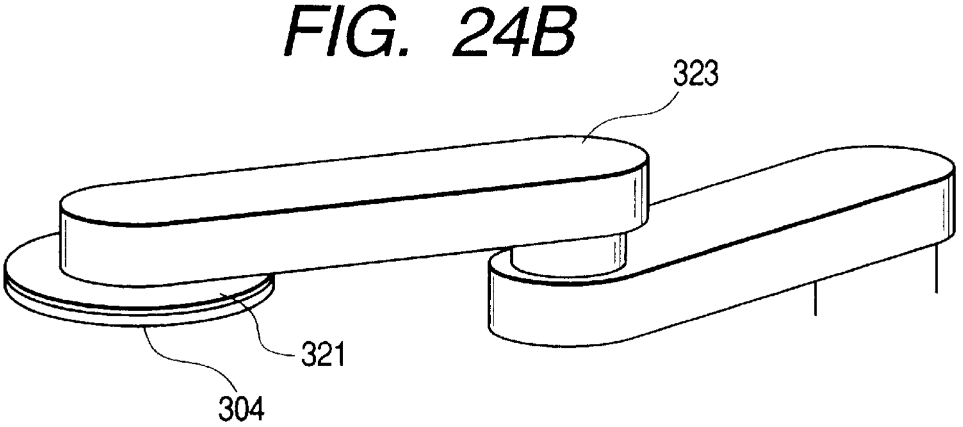
Figure 24C:
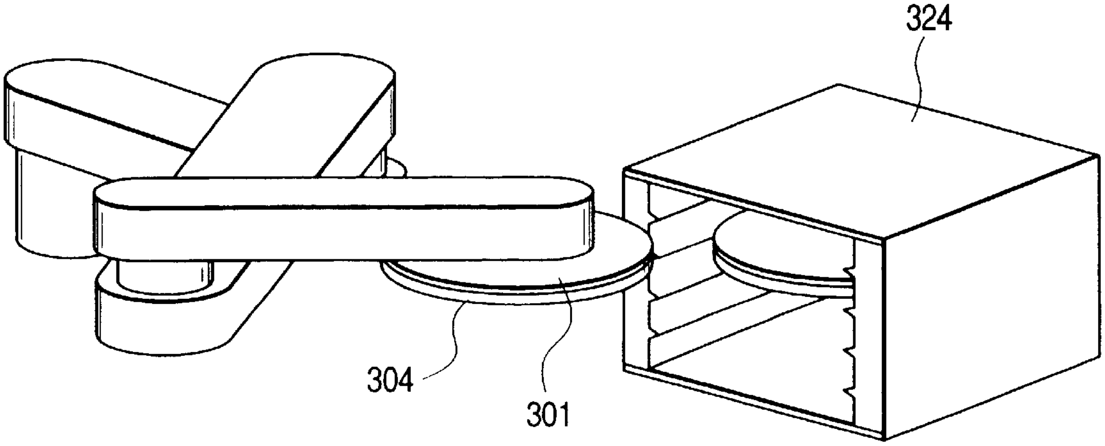

FIGS. 24A to 24C show other steps of conveying the silicon wafer 301 with the UV peelable tape 304 to the cassette tray 324.

After the thinning of the silicon wafer 301 on a stage 321 with a vacuum chuck as shown in FIG. 24A, the vacuum of the stage is terminated and the silicon wafer 301 with the UV peelable tape 304 is sucked from the wafer side by a robot arm 323 with a vacuum chuck, as shown in FIG. 24B.

Then the sucked silicon wafer 301 with the UV peelable tape 304 is conveyed to a cassette tray 324 as shown in FIG. 24D, whereby the silicon wafer 301 with the UV peelable tape 304 is housed in the cassette tray 324 as shown in FIG. 23.

The silicon wafer 301 with the UV peelable tape 304 housed in the cassette tray 324 may be stored in a process state for conveying the silicon wafer 301.

The above-described producing method for the orifice plate in the sixth embodiment is not limited to the preparation of the orifice plate but is likewise applicable for producing a silicon plate such as a semiconductor chip. In the application for producing a semiconductor chip, the plate dividing pattern, being formed by dry etching, can be formed in an arbitrary manner, providing a larger freedom in the external shape of the semiconductor chip. Also because the plate dividing pattern is formed by dry etching, the external periphery portion of the wafer can be left free of the plate dividing pattern, whereby the external periphery portion may be maintained intact after the thinning operation. Therefore, in the grinding and polishing operations, the external periphery portion of the wafer can be protected and can be prevented from fluctuation in the thickness resulting from a decrease in the thickness therein, or chipping or cracking of the orifice plate in the external periphery portion as encountered in the "prior dicing" process, whereby the dimensional precision and production yield can be improved. Also since the external periphery portion remains after the thinning operation, the wafer is supported by such external periphery portion and the UV peelable tape. Thus the wafer after the thinning operation has a higher rigidity and shows a smaller bending in the conveying of wafer or the insertion thereof into the cassette as explained in relation to FIGS. 22A to 22D through 24A to 24C, thereby preventing troubles in conveying or cracks by collision. Therefore the drawbacks in the "prior dicing" process can be resolved.

The liquid discharge head of the present invention and the producing method therefor are not limited to those explained in the foregoing first to fourth embodiments, but the present invention also includes combinations of the configurations of the liquid discharge head explained in the first to sixth embodiments and combinations of the producing steps explained in those embodiments.

Also, the silicon plate explained in the foregoing embodiments and the producing method therefor can be applied to a filter for preventing dust intrusion in liquid and a producing method therefor. Such filter is to prevent intrusion of dusts larger than penetrating holes formed in the filter. According to the presents invention, an alkali-resistant film is formed on the filter surface and in the interior of the penetrating holes, so that the filter can be used in stable manner even in liquid which attacks silicon. Also a water-repellent film is formed on the filter surface thereby increasing the hydrophilicity in the interior of the penetrating holes than on the filter surface, thereby realizing efficient liquid flow in the penetrating holes. Also the protective film in the interior of the penetrating holes is made to protrude to form projections, whereby, in a step of coating a water-repellent agent on the filter surface for forming a water-repellent film thereon, the water-repellent agent can be easily coated on the filter surface without intrusion into the interior of the penetrating holes.

[Liquid Discharge Recording Apparatus]

Figure 15:
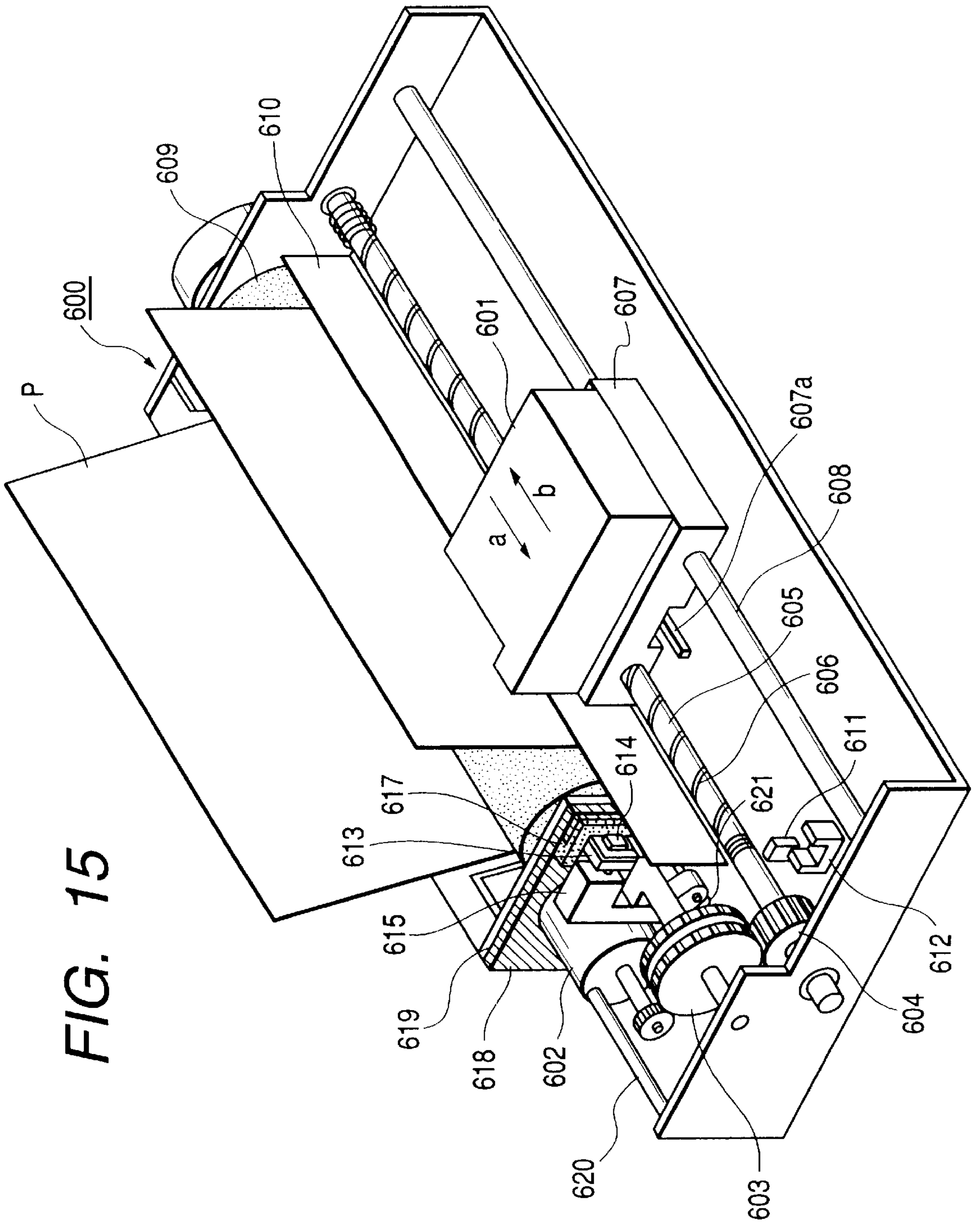
FIG. 15 is a perspective view showing an ink jet recording apparatus, constituting an example of the liquid discharge recording apparatus equipped with the liquid discharge head produced by the producing method of the present invention for the liquid discharge head.

FIG. 15 is a perspective view showing an ink jet recording apparatus, as an example of the liquid discharge recording apparatus, in which mounted is a liquid discharge head produced by the aforementioned method. A head cartridge 601 mounted in the ink jet recording apparatus 600 shown in FIG. 1 is provided with a liquid discharge head, produced by any of the foregoing methods, and a liquid container containing liquid to be supplied to such liquid discharge head. As shown in FIG. 15, the head cartridge 601 is mounted on a carriage 506 engaging with a spiral groove 606 of a lead screw 605, which is rotated through transmission gears 603, 604 by forward or reverse rotation of a driving motor 602. The head cartridge 601, together with the carriage 607, is reciprocated in directions a and b, along a guide 608, by the rotation of the driving motor 602. The ink jet recording apparatus 600 is also provided with recording medium conveying means (not shown) for conveying a printing sheet P, constituting a recording medium for receiving the liquid discharged from the head cartridge 601. A pressing plate 610, for pressing the printing sheet P which is conveyed on a platen 609 by the conveying means, presses the printing sheet P toward the platen 609 along the moving direction of the carriage 607.

In the vicinity of an end of the lead screw 605, there are provided photocouplers 611, 612, constituting home position detection means for detecting the presence of a lever 607*a* of the carriage 607 in the region of the photocouplers 611, 612 thereby switching the rotating direction of the driving motor 602. In the vicinity of an end of the platen 609, there is provided a support member 613 for supporting a cap member 614, which covers the front face, having the discharge ports, of the head cartridge 601. There is also provided ink suction means 615 for sucking ink, discharged by idle emission from the head cartridge 601 and collected in the cap member 614. The ink suction means 615 executes suction recovery of the head cartridge 601 through a port of the cap member 614.

The ink jet recording apparatus 600 is provided with a main body supporting member 619, on which a movable member 618 is supported movably in the front-rear direction, namely in a direction perpendicular to the moving direction of the carriage 607. The movable member 618 supports a cleaning blade 617. The cleaning blade 617 is not limited to the illustrate form but can assume any known form. Also a lever 620 is provided for starting the sucking operation at the suction recovery by the ink suction means 615, and is moved by the movement of a cam 621 engaging with the carriage 607, whereby the transmission of the driving force of the driving motor 602 is controlled through known transmission means such as a clutch. An ink jet recording control unit, for sending signals to the heat generating members provided in the head cartridge 601 and controlling the above-mentioned mechanisms is provided in the main body of the ink jet recording apparatus and is not illustrated in FIG. 15. The ink jet recording control unit is provided with drive signal supply means for supplying drive signals for causing the liquid discharge head to discharge the liquid.

The ink jet recording apparatus 600 of the above-described configuration executes recording on the printing sheet P which is conveyed on the platen 609 by the afore-mentioned recording medium conveying means, by executing reciprocating motion of the head cartridge 601 over the entire width of the printing sheet P.

As explained in the foregoing, the present invention allows, in case of employing a silicon-containing material, same as that of the head main body, in the orifice plate, to realize a liquid discharge head of an elongated size with high reliability, by forming recesses by etching on the surface of a substrate consisting of such silicon-containing material in the preparation of the orifice plate and thinning such substrate from the reverse side thereof, thereby obtaining an orifice plate with plural discharge ports from such substrate. Also a protective film constituting the internal wall of the discharge port is made to protrude from the surface of the discharge ports, whereby dispensed with is a cleaning operation of the area around the nozzle by wiping with a blade, so that there can be simplified the structure of the main body of the liquid discharge recording apparatus utilizing the liquid discharge head and the control sequence therefor. Further, the substrate for forming the orifice plate can be reinforced with a frame member whereby plural head main bodies can be adjoined to such orifice plate. Thus there is realized a producing method for the liquid discharge head, ink which the orifice plate can include not only a nozzle array but also plural nozzle arrays with mutual alignment. As a result, there can be produced a liquid discharge head of excellent performance with a reduced cost.

What is claimed is:

1. A method for collectively producing plural silicon plates by forming plural functional units on a silicon wafer and dividing the silicon wafer for each functional unit, comprising:

a step of forming, by dry etching, a plate dividing pattern corresponding to an external shape of each silicon plate on a first surface of the silicon wafer;

a step of dividing the silicon wafer by thinning the silicon wafer from a reverse surface opposite to the first surface at least to the plate dividing pattern; and a step of providing each silicon plate with a through hole, wherein a through hole formation portion and the plate dividing pattern are simultaneously etched during the step of dry etching.

2. The producing method according to claim 1, wherein the step of thinning the silicon wafer is executed by reducing the thickness of the silicon wafer from the reverse surface thereof by a process selected from the group consisting of grinding, polishing, and etching.

3. The producing method according to claim 1, further comprising, before the step of dividing the silicon wafer, a step of providing a tape on the surface of the silicon wafer, in order to maintain the strength of the silicon wafer during any subsequent grinding or polishing thereof.

4. The producing method according to claim 3, further comprising, after the step of dividing the silicon wafer, a step of peeling off the tape.

5. The producing method according to claim 3, further comprising, after the step of dividing the silicon wafer, a step of conveying the silicon plate.

6. The producing method according to claim 5, wherein the silicon plate is stored during the step of conveying the silicon plate.

7. The producing method according to claim 1, wherein the plate dividing pattern is formed excluding an external periphery of the wafer.

* * * * *

UNITED STATES PATENT AND TRADEMARK OFFICE

CERTIFICATE OF CORRECTION

PATENT NO. : 6,569,343 B1

DATED : May 27, 2003

INVENTOR(S) : Yoshiaki Suzuki et al.

It is certified that error appears in the above-identified patent and that said Letters Patent is hereby corrected as shown below:

Title page, Item [54] and Column 1, lines 1-6,
Title should read -- METHOD FOR PRODUCING SILICON PLATES --.

Column 1,
Line 39, "has" should read -- has been --.

Column 2,
Line 5, "a" should be deleted; and
Line 6, "the mass producivility" should read -- mass production --.

Column 3,
Line 17, "mentioned" should read -- method --.

Column 4,
Line 36, "provide" should read -- provides --.

Column 8,
Line 3, "can" should read -- can be a --.

Column 14,
Line 3, "from" should read -- form --.

Column 25,
Line 21, "grond" should read -- ground --;
Line 34, "tyep" should read -- type --; and
Line 37, "dificient" should read -- in deficient --.

UNITED STATES PATENT AND TRADEMARK OFFICE

CERTIFICATE OF CORRECTION

PATENT NO. : 6,569,343 B1
DATED : May 27, 2003
INVENTOR(S) : Yoshiaki Suzuki et al.

It is certified that error appears in the above-identified patent and that said Letters Patent is hereby corrected as shown below:

Column 27,
Line 53, "illustrate" should read -- illustrated --.

Signed and Sealed this

Twentieth Day of January, 2004

JON W. DUDAS
*Acting Director of the United States Patent and Trademark Office*